US012320761B2

(12) United States Patent
Ashok et al.

(10) Patent No.: US 12,320,761 B2
(45) Date of Patent: Jun. 3, 2025

(54) MULTIPLEXED COMPUTED TOMOGRAPHY X-RAY IMAGING

(71) Applicant: Arizona Board of Regents on Behalf of the University of Arizona, Tucson, AZ (US)

(72) Inventors: Amit Ashok, Tucson, AZ (US); Ahmad Masoudi, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 557 days.

(21) Appl. No.: 17/601,274

(22) PCT Filed: Apr. 6, 2020

(86) PCT No.: PCT/US2020/026907
§ 371 (c)(1),
(2) Date: Oct. 4, 2021

(87) PCT Pub. No.: WO2020/206440
PCT Pub. Date: Oct. 8, 2020

(65) Prior Publication Data
US 2022/0178852 A1    Jun. 9, 2022

Related U.S. Application Data

(60) Provisional application No. 62/830,283, filed on Apr. 5, 2019.

(51) Int. Cl.
*G01N 23/046* (2018.01)
*G01V 5/22* (2024.01)
*G01V 5/226* (2024.01)

(52) U.S. Cl.
CPC ........... *G01N 23/046* (2013.01); *G01V 5/226* (2024.01); *G01N 2223/401* (2013.01); *G01N 2223/419* (2013.01); *G01V 5/224* (2024.01)

(58) Field of Classification Search
CPC ........... G01N 23/046; G01N 2223/401; G01N 2223/419; G01V 5/005; G01V 5/0041
See application file for complete search history.

(56) References Cited

U.S. PATENT DOCUMENTS 6,483,892 B1 * 11/2002 Wang .................... A61B 6/508
378/43
7,388,940 B1    6/2008 De Man et al.
(Continued)

FOREIGN PATENT DOCUMENTS

WO    WO-2023072912 A1 *  5/2023 ............. G01N 23/04

OTHER PUBLICATIONS

International Search Report and Written Opinion mailed Jul. 1, 2020 for International Patent Application No. PCT/US2020/026907 (9 pages).
(Continued)

*Primary Examiner* — Christine S. Kim
(74) *Attorney, Agent, or Firm* — Perkins Coie LLP

(57) ABSTRACT

Methods, system and devices for multiplexed x-ray detection systems are described. The x-ray detection systems are designed using a multiplexed array of x-ray sources that are turned on simultaneously in groups of two or more x-ray sources to form multiple exposures that are detected by a plurality of detectors. The number of exposures, as well as x-ray source characteristics and parameters, such as the number and output energy level associated with each x-ray source are determined to optimize the quality of reconstrued images or maximize the detection/classification accuracy of object(s) and/or material(s) based on a total photon energy budget. The disclosed detection methods and devices improve both the quality and acquisition speed of x-ray images and x-ray measurement data for detection/classification of object(s) and/or material(s).

22 Claims, 19 Drawing Sheets

(56) References Cited

U.S. PATENT DOCUMENTS

| | | | |
|---|---|---|---|
| 7,545,907 B2* | 6/2009 | Stewart | A61B 6/542 378/108 |
| 7,873,201 B2 | 1/2011 | Eilbert et al. | |
| 8,746,973 B2 | 6/2014 | Gregerson et al. | |
| 8,817,947 B2* | 8/2014 | Vedantham | A61B 6/4007 378/21 |
| 9,778,391 B2* | 10/2017 | Chen | G01V 5/0066 |
| 9,784,883 B2* | 10/2017 | Chen | G01V 5/005 |
| 2003/0231739 A1* | 12/2003 | Rosner | G01N 23/046 378/57 |
| 2017/0172526 A1 | 6/2017 | Chiang | |
| 2022/0091051 A1* | 3/2022 | Chen | G01N 23/10 |

OTHER PUBLICATIONS

Masoudi, Ahmad, et al., "Multiplexed Measurement Design for Image Reconstruction In Fixed-Gantry X-ray Computed Tomography," Department of Electrical and Computer Engineering, University of Arizona, (26 pages).

\* cited by examiner

Table 1. NRMSE in percent comparison between conventional and MUX – Training Set

| $J_0$ | $10^7$ | $10^8$ | $10^9$ | $10^{10}$ |
|---|---|---|---|---|
| NRMSE-CONV | 13.01±0.11 | 6.85±0.07 | 2.83±0.02 | 1.26±0.009 |
| NRMSE-MUX1 | 14.88±0.11 | 7.86±0.04 | 7.01±0.02 | 6.66±0.008 |
| NRMSE-MUX3 | 5.56±0.05 | 3.10±0.02 | 1.22±0.009 | 0.50±0.004 |
| NRMSE-MUX5 | 5.11±0.04 | 2.82±0.02 | 1.05±0.007 | 0.40±0.003 |

Table 2. SSIM comparison between conventional and MUX – Training Set

| $J_0$ | $10^7$ | $10^8$ | $10^9$ | $10^{10}$ |
|---|---|---|---|---|
| SSIM-CONV | 0.9765±3.88e-4 | 0.9944±8.50e-5 | 0.9990±1.44e-5 | 0.9998±2.33e-6 |
| SSIM-MUX1 | 0.9680±4.90e-4 | 0.9873±1.42e-4 | 0.9860±5.43e-5 | 0.9895±2.26e-5 |
| SSIM-MUX3 | 0.9955±7.91e-5 | 0.9988±1.86e-5 | 0.9998±3.17e-6 | 1±4.81e-7 |
| SSIM-MUX5 | 0.9965±5.77e-5 | 0.9991±1.36e-5 | 0.9999±1.94e-6 | 1±2.54e-7 |

Table 3. NRMSE in percent comparison between conventional and MUX – Test Set

| $J_0$ | $10^7$ | $10^8$ | $10^9$ | $10^{10}$ |
|---|---|---|---|---|
| NRMSE-CONV | 13.79±0.26 | 6.93±0.13 | 2.95±0.04 | 1.28±0.02 |
| NRMSE-MUX1 | 13.62±0.26 | 7.72±0.09 | 7.22±0.04 | 6.36±0.02 |
| NRMSE-MUX3 | 6.09±0.12 | 3.16±0.05 | 1.26±0.02 | 0.50±0.006 |
| NRMSE-MUX5 | 5.45±0.11 | 2.81±0.04 | 1.05±0.02 | 0.39±0.006 |

Table 4. SSIM comparison between conventional and MUX – Test Set

| $J_0$ | $10^7$ | $10^8$ | $10^9$ | $10^{10}$ |
|---|---|---|---|---|
| SSIM-CONV | 0.9793±7.80e-4 | 0.9947±1.85e-4 | 0.9991±3.22e-5 | 0.9998±4.98e-6 |
| SSIM-MUX1 | 0.9773±9.15e-4 | 0.9904±2.55e-4 | 0.9913±9.65e-5 | 0.9939±3.57e-5 |
| SSIM-MUX3 | 0.9955±1.99e-4 | 0.9989±3.99e-5 | 0.9998±6.82e-6 | 1±1.09e-6 |
| SSIM-MUX5 | 0.9967±1.21e-4 | 0.9991±2.66e-5 | 0.9999±4.41e-6 | 1±5.72e-7 |

FIG. 10

| $J_0$ | $10^7$ | $10^8$ | $10^9$ | $10^{10}$ |
|---|---|---|---|---|
| NRMSE-CONV | 27.45±0.30 | 9.02±0.11 | 6.39±0.06 | 2.62±0.02 |
| NRMSE-MUX1 | 21.63±0.19 | 16.96±0.06 | 15.73±0.02 | 15.58±0.008 |
| NRMSE-MUX3 | 10.45±0.10 | 6.16±0.07 | 6.07±0.03 | 5.12±0.01 |
| NRMSE-MUX5 | 8.30±0.08 | 4.76±0.05 | 3.55±0.03 | 1.97±0.01 |

Table 7. NRMSE in percent comparison between conventional and MUX - Test Set

| $J_0$ | $10^7$ | $10^8$ | $10^9$ | $10^{10}$ |
|---|---|---|---|---|
| SSIM-CONV | 0.9340±1.1e-3 | 0.9888±2.59e-4 | 0.9953±9.60e-5 | 0.9991±2.04e-5 |
| SSIM-MUX1 | 0.9398±8.47e-4 | 0.9529±3.06e-4 | 0.9591±1.01e-4 | 0.9596±3.88e-5 |
| SSIM-MUX3 | 0.9831±2.84e-4 | 0.9938±1.55e-4 | 0.9939±7.43e-5 | 0.9949±2.37e-5 |
| SSIM-MUX5 | 0.9898±2.10e-4 | 0.9968±7.09e-5 | 0.9983±3.42e-5 | 0.9993±9.38e-6 |

Table 8. SSIM comparison between conventional and MUX - Test Set

FIG. 11(b)

| $J_0$ | $10^7$ | $10^8$ | $10^9$ | $10^{10}$ |
|---|---|---|---|---|
| NRMSE-CONV | 27.45±0.30 | 9.02±0.11 | 6.39±0.06 | 2.62±0.02 |
| NRMSE-MUX1 | 21.63±0.19 | 16.96±0.06 | 15.73±0.02 | 15.58±0.008 |
| NRMSE-MUX3 | 10.45±0.10 | 6.16±0.07 | 6.07±0.03 | 5.12±0.01 |
| NRMSE-MUX5 | 8.30±0.08 | 4.76±0.05 | 3.55±0.03 | 1.97±0.01 |

Table 7. NRMSE in percent comparison between conventional and MUX - Test Set

| $J_0$ | $10^7$ | $10^8$ | $10^9$ | $10^{10}$ |
|---|---|---|---|---|
| SSIM-CONV | 0.9340±1.1e-3 | 0.9888±2.59e-4 | 0.9953±9.60e-5 | 0.9991±2.04e-5 |
| SSIM-MUX1 | 0.9398±8.47e-4 | 0.9529±3.06e-4 | 0.9591±1.01e-4 | 0.9596±3.88e-5 |
| SSIM-MUX3 | 0.9831±2.84e-4 | 0.9938±1.55e-4 | 0.9939±7.43e-5 | 0.9949±2.37e-5 |
| SSIM-MUX5 | 0.9898±2.10e-4 | 0.9968±7.09e-5 | 0.9983±3.42e-5 | 0.9993±9.38e-6 |

Table 8. SSIM comparison between conventional and MUX - Test Set

FIG. 12(b)

MULTIPLEXED COMPUTED TOMOGRAPHY X-RAY IMAGING

CROSS-REFERENCE TO RELATED APPLICATION(S)

This patent document is a 371 National Phase Application of International Patent Application PCT/US2020/026907, filed Apr. 6, 2020, which claims priority to the provisional application with Ser. No. 62/830,283, titled "Multiplexed Computed Tomography X-Ray Imaging," filed Apr. 5, 2019. The entire contents of the above noted applications are incorporated by reference as part of the disclosure of this document for all purposes.

STATEMENT REGARDING FEDERALLY SPONSORED RESEARCH OR DEVELOPMENT

This invention was made with government support under Grant No. HSHQDC-14-C-B0010 awarded by U.S. Department of Homeland Security. The government has certain rights in the invention.

TECHNICAL FIELD

This invention generally relates to imaging systems and, more specifically, to x-ray imaging systems that utilize multiple sources.

BACKGROUND

X-ray Computed Tomography (CT) based imaging systems are widely used for security and industrial inspection applications like passenger baggage and cargo screening at the airports, shipping container screening at ports, and industrial parts inspection. Typically, such CT systems employ a mechanical rotating gantry, comprising of X-ray source(s) and detector array(s), to collect a large number of angularly diverse projections scans of an object. However, such mechanical scanning mechanism adds to system cost and complexity for operations and maintenance. The next generation fixed gantry (FG) CT system architecture employs several X-ray sources and detector arrays in a fixed geometry to accomplish the same measurement functionality with reduced system costs and complexity and enables higher system throughput. However, there is still a need to further improve the speed and reliability of detections, while maintaining or lowering the cost of such systems.

SUMMARY

The embodiments disclosed in this patent document relate to multiplexed measurement methods, devices and systems that improve X-ray imaging systems' performance, subject to the source flux budget. The disclosed multiplexed measurement systems can significantly outperform the sequential measurement designs employed in traditional systems.

One x-ray detection system includes a plurality of x-ray sources configured to illuminate an area designated for placement of an object from a plurality of different angles, and a plurality of detectors positioned in periphery of the area, where each detector is configured to receive x-ray radiation associated with one or more of the x-ray sources upon passage through the object. The x-ray sources are configured to selectively emit x-ray radiation toward the object in groups of two or more x-ray sources that are turned on simultaneously to provide a single exposure, and each of the plurality of the x-ray sources is configured to turn on at a particular energy level above zero and below a predetermined maximum output energy level. Additionally, the x-ray sources are configured to provide a plurality of exposures by selectively turning on a first group of two or more x-ray sources simultaneously to provide a first exposure and by selectively turning on one or more additional groups of two or more x-ray sources to provide additional exposures.

BRIEF DESCRIPTION OF THE DRAWINGS

FIG. 2(a) illustrates a conventional fixed-gantry measurement system with one source turned on.

FIG. 10 provides four tables comparing different performance characteristics associated with FIGS. 6 to 9.

FIG. 11(b) illustrates tables comparing different performance characteristics associated with FIG. 11(a).

FIG. 12(b) illustrates tables comparing different performance characteristics associated with FIG. 12(a).

DETAILED DESCRIPTION

Figure 1:
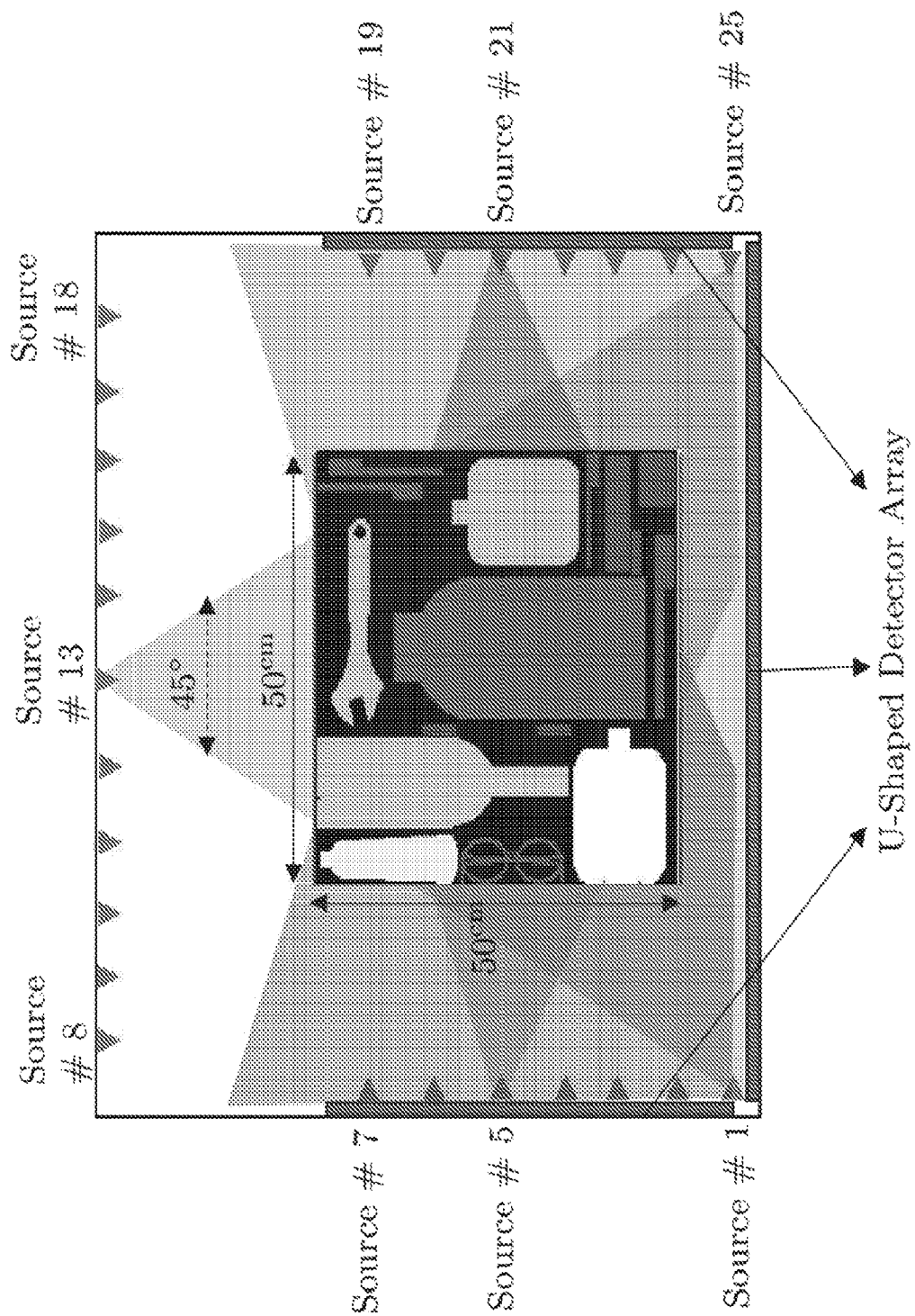
FIG. 1 illustrates a fixed-gantry measurement system in accordance with an example embodiment.

The ability to provide three-dimensional high-fidelity images makes x-ray computed tomography (CT) a suitable imaging modality for many security applications such as, bag screening at airports. The traditional x-ray CT imaging system collects project measurements (i.e. radiographs) from different views by physically rotating the x-ray source and detector array around the object. This x-ray CT system architecture is typically referred to as "rotating gantry". The physical motion in rotating gantry x-ray CT machines imposes several constraints, such as rate of scan. Recently, there has been an emergence of architectures that employ a set of sources and detectors in a fixed geometric configuration, and these architectures are referred to as "rectangular fixed gantry" (RFG). Employing fixed gantry not only makes the measurement process faster but also potentially offers non-standard measurement protocols that involving illuminating the object by turning on several x-ray sources simultaneously. In this patent document, we refer to one set of non-standard measurement designs as multiplexed measurements; these measurements, however, can be applied to different types of gantries.

The disclosed embodiments, among other features and benefits, enable the design of multiplexed measurement for gantry systems for reconstruction/estimation and object/material detection and classification tasks. In order to design an imaging system for any computational task such as image reconstruction, we need to quantify it. Based on information theory, Task-Specific Information (TSI) metric can be employed to quantify the task-specific performance of any imaging system for different tasks such as target detection, estimation and localization can be developed. For instance, inspired by TSI approach some systems can employ Bhattacharya distance or Cauchy-Schwarz divergence to determine an upper-bound on the detection error and design the multiplexed measurement model for gantry x-ray CT system by minimizing the bound on the detection error. In some embodiments of the present application, the multiplexed measurement can be designed such that it minimizes the reconstruction/estimation error as measured by the Normalized Mean Square Error (NMSE) metric or the Mean Square Error (MSE) the metric.

In many scenarios MSE does not have a closed analytical expression and its numerical evaluation is computationally expensive. As a result, in such cases using MSE as a metric for imaging system design becomes impractical and intractable. In some embodiments, instead of using MSE metric directly other bounds on MSE can be utilized. In one example embodiment, the Bayesian Cramer-Rao Lower Bound (CRLB) on MSE is used to design the multiplexed measurement system. In the sections that follow, mathematical models are used to characterize real measurement systems that find applications in cargo inspection, airport security and screening, and other physical imaging and detection systems. The mathematical modeling and representations enable the determination of an optimized (or generally improved) measurement systems that include multiple radiation sources positioned to radiate an object of interest at various fluence levels.

FIG. 1 illustrates a fixed-gantry measurement system in accordance with an example embodiment. The depicted two-dimensional rectangular fixed-gantry (RFG) x-ray CT system includes 25 sources located around the object and a U-shaped photon-counting detector array having 1100 detectors with size of 2 mm. In the depicted example, each source generates a 45-degree x-ray fan-beam and with a photon energy of 110 KeV. The tunnel size is consistent with current systems and provides sufficient space for a 50 cm×50 cm piece of luggage (the object in this example is a bag containing various items). For example, for a 50 cm×50 cm object, each segment or voxel/pixel of the object is 1 cm×1 cm. The objects used for simulation and studies can be synthetic bags. For example, the bags can be generated by Stochastic Bag Generator (SBG) utilizing shape and material libraries. In one example, the shape library has 10 non-threat items and 4 threat items. The size of each item can be selected randomly. In this case, the material library has 14 non-threat material and 8 threat material.

In order to quantify the operation of the system shown in FIG. 1, the case in which only the $s^{th}$ source is turned on is considered first. Based on Beer's law, the mean number of photons at the detectors as $\bar{r}_s = J_s e^{-H_s f}$ can be computed, where the vector $r_s$ represents the measurement vector, whose components indicate the number of photons collected at each detector in the detector array. The mean of r can be represented by $\bar{r}_s$, $J_s$ is the number of photons generated by the $s^{th}$ source, $H_s$ is the projection matrix associated with the $s^{th}$ source, f is the bag attenuation coefficients which are lexicogrmphically ordered into a vector so if the bag has the size of N×N pixels then f is an $N^2 \times 1$ vector, so $f = [f_1, f_2, \ldots, f_{N^2}]^T$.

Another important note on the example system geometry of FIG. 1 is that each source shoots the photons to the detectors directly in front of it. For example, the photons from sources located on the left side of gantry (sources 1 to 7) can only be received by the detectors on the right side of gantry. Similarly, the photons from the sources located on the right side of gantry (sources 19 to 25) can be received by the detectors on the left side of gantry and the photons from sources located on the top of gantry (sources 8 to 18) can only be received by detectors located at the bottom of the gantry.

The notation introduced above captures any measurement associated with a single exposure. In order to capture the outcome of sequence of exposures, the measurements from each exposure are concatenated. To establish a baseline reconstruction performance, the reconstruction performance of the rectangular fixed-gantry system is analyzed based on measurements that use all sources in sequence with the same number of photons. This approach is referred to as the "conventional" approach in the analysis that follows, and its measurement vector is represented by $R = [r_1 \ldots r_{25}]$, where here $r_1$ is the measurement from the $i^{th}$ source.

Unlike in a conventional system, in the disclosed multiplexed system, multiple sources can be employed simultaneously at varying fluence levels. Denoting the number of multiplexed exposures as E. and the number of photons at $i^{th}$ source in the $e^{th}$ multiplexed exposure as $J_i^e$, the mean number of photons at the detector array for $e^{th}$ exposure is $$\bar{r}_e = \sum_{i=1}^{25} J_i^e e^{-H_i f}.$$

The mean measurement, i.e. number of photons detected at the detectors, for all the exposures is $\bar{R}=[\bar{r}_1; \ldots; \bar{r}_E]$ and the measurement vector is $R=\text{Poiss}(\bar{R})$.

Figure 2B:
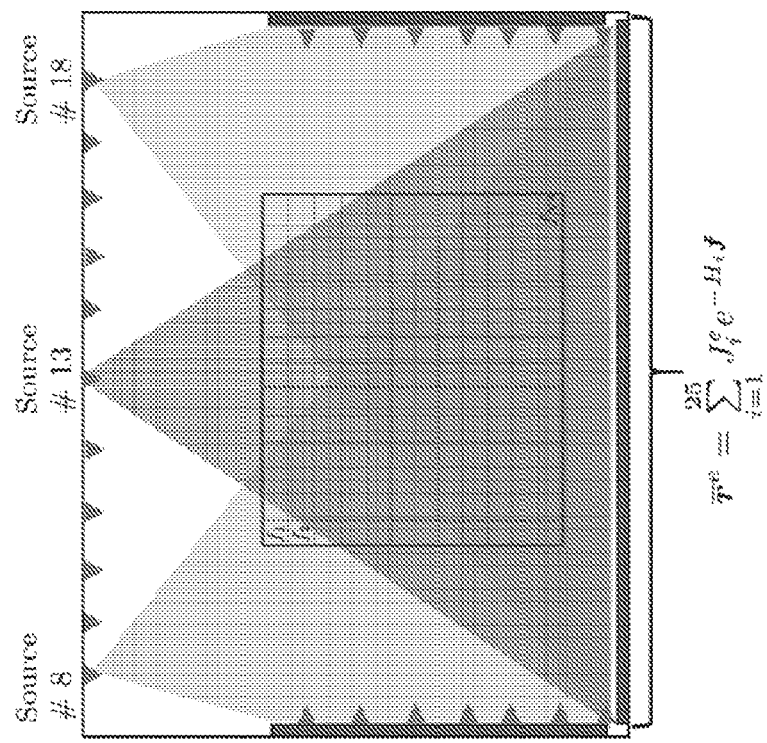
FIG. 2(b) illustrates a multiplexed fixed-gantry measurement system with simultaneous exposures in accordance with an example embodiment.
Figure 2A:
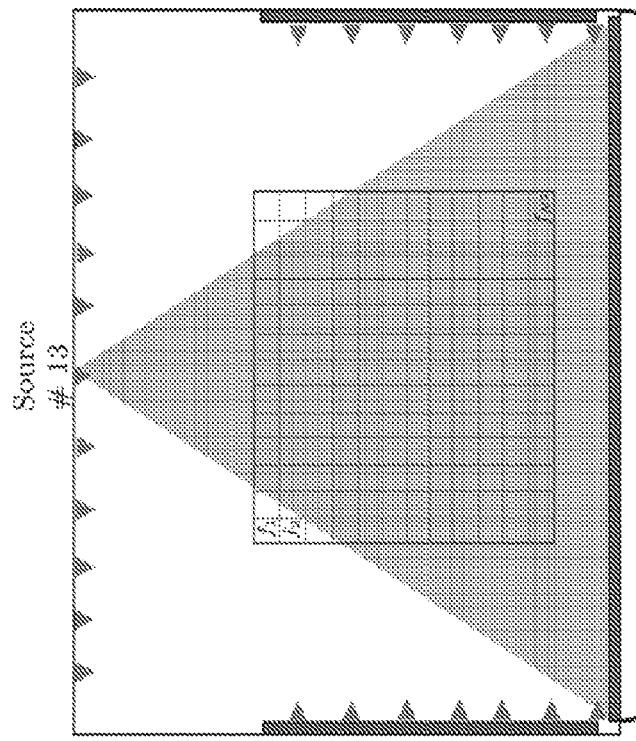

FIG. 2(a) illustrates a conventional fixed-gantry measurement system with one source turned on. FIG. 2(b) illustrates a multiplexed fixed-gantry measurement system with simultaneous exposures in accordance with an example embodiment. In FIG. 2(a), the measurement model for conventional system at $13^{th}$ exposure is illustrated, where source 13 is turned on with the number of photons $J_{13}$. In contrast, FIG. 2(b) illustrates the multiplexed system at $e^{th}$ exposure, where sources 8, 13 and 18 are simultaneously turned on with associated number of photons $J_8^e$, $J_{13}^e$ and $J_{18}^e$, respectively.

As evident from the position of the sources in FIG. 1, we can see that the system has vertical symmetry, which makes to reasonable to also assume that the photon distribution among the sources follows the same vertical symmetry, as well. Based on this symmetry, for the conventional system, $J_i=J_{26-i}$ for $i=1, \ldots, 12$. Similarly, for the multiplexed system, $J_i^e=J_{26-i}^e$ for $i=1 \ldots, 12$ and $e=1, \ldots, E$. Based on the vertical symmetry, the measurement model for both conventional and multiplex systems can be updated. For the conventional system, we assume that total photons budget available is $J_0$ and each source has same number of photons. This means that $$J_i = J_{26-i} = \frac{J_0}{25} \text{ for } i = 1, \ldots, 13.$$

For the multiplexed system, $$\sum_{e=1}^{E}\left[J_{13}^e + \sum_{i=1}^{12} 2J_i^e\right] = J_0$$

and the measurement model for $e^{th}$ multiplexed exposure is $$\bar{r}_e = J_{13}e^{-H_{13}f} + \sum_{i=1}^{12} J_i^e\left(e^{-H_i f} + e^{-H_{26-i}f}\right).$$

In some disclosed embodiments, the multiplexed measurement system can be designed by minimizing the Bayesian Cramer-Rao Lower Bound (CRLB), a metric quantifying reconstruction fidelity error subject to limited total photon budget $$J_0 = \sum_{e=1}^{E}\left[J_{13}^e + \sum_{i=1}^{12} 2J_i^e\right].$$

The problem to solve can be written mathematically as below:

$$\underset{J}{\text{argmin trace}} \left(F^{-1}\right) \quad (1)$$

$$\text{subject to } \sum_{e=1}^{E}\left[J_{13}^e \sum_{i=1}^{12} 2J_i^e\right] = J_0$$

In Eq (1), $J=[J_1^1, \ldots, J_{13}^E]$ are photon distribution for each source at each exposure. F is the Bayesian Fisher Information matrix which is a function of J, system geometry (i.e. source and detector arrangement).

The optimization in Eq (1) can be solved using gradient descent. Because the objective function in the optimization problem is not convex, the optimization problem can be solved using a number of different random starting points (e.g., 1000 points) and the solution with the minimum value can be selected. Due to the non-convexity of the problem, the gradient descent methodology can result in a sub-optimal multiplexed design.

In one example, a simulation using a training set contains 400 bags is performed. In this example, the bags have a size 25 cm by 25 cm, with a pixel size of 20 mm×20 mm. In other examples, the reconstruction performance of the designed system can be quantified for bags that are 50 cm by 50 cm, with a pixel size of 10 mm×10 mm.

In some embodiments, the Bayesian Cramer-Rao Lower Bound (CRLB) on MSE can be used to optimize the problem stated in Eq (1) in order to design the multiplexed measurement system. CRLB is a function of Fisher Information Matrix (FIM), $\mathcal{I}$ that $\mathcal{I}$ represents available information on the parameter of interest. In the context of the embodiments, as exemplified by the baggage screening, the parameter is the bag attenuation coefficients, $f$, from random measurements. The FIM measures the information by determining the average curvature of log-likelihood of the measurement, hence mathematically, FIM or $\mathcal{I}$ can be defined as below:

$$\mathcal{I}(f) = -E\{\nabla_f^2 \log(\text{Poiss}(R;\bar{R}?))\} \quad (2)$$

Remember that based on the measurement model defined previously, the log-likelihood, $\log(\text{Poiss}(R; \bar{R}))$, is function of the bag attenuation coefficient, $f$. Here Poiss® denotes the Poisson noise limited photon detection, however, this photon detection model can be replaced by another model as needed. Based on Eq (2), FIM for the conventional system can be represented as follows:

$$\mathcal{I}(f) = H^T(J_0 e^{-Hf})H \quad (3)$$

In Eq (3), $H=[H_1; \ldots; H_{25}]$. For the disclosed multiplexed measurement systems with E number of exposures, FIM can be represented as:

$$\mathcal{I}(f) = \sum_{e=1}^{E}\sum_{d=1}^{D} \frac{1}{J_{13}^e e^{-h_{13}^d f} + \sum_{h=1}^{12} J_k^e\left(e^{-h_k^d f} + e^{-h_{26-k}^d f}\right)} \quad (4)$$

$$\left[\sum_{i=1,j=1}^{12} J_i^e J_j^e \left(e^{-(h_i^d + h_j^d)f}\left(h_i^d \times h_j^d\right) + e^{-(h_{26-i}^d + h_j^d)f}\left(h_{26-i}^d \times h_j^d\right) + \right.\right.$$
$$\left. e^{-(h_i^d + h_{26-j}^d)f}\left(h_i^d \times h_{26-j}^d\right) + e^{-(h_{26-i}^d + h_{26-j}^d)f}\left(h_{26-i}^d \times h_{26-j}^d\right)\right) +$$
$$\sum_{j=1}^{12} J_{13}^e J_j^e\left(e^{-(h_{13}^d + h_j^d)f}\left(h_{13}^d \times h_j^d\right) + e^{-(h_{13}^d + h_{26-j}^d)f}\left(h_{13}^d \times h_{26-j}^d\right)\right) +$$
$$\left.\sum_{i=1}^{12} J_{13}^e J_i^e\left(e^{-(h_i^d + h_{13}^d)f}\left(h_i^d \times h_{13}^d\right) + e^{-(h_{26-i}^d + h_{13}^d)f}\left(h_{26-i}^d \times h_{13}^d\right)\right)\right]$$

In Eq (4), $J_i^e$ represents the number of photons at the $i^{th}$ source in the $e^{th}$ multiplex measurement, $h_i^d$ is the $d^{th}$ row of system matrix $H_i$ and "x" represents the outer product.

The CRLB is a lower bound on covariance of estimator and it is a function of FIM and estimator bias. If $\hat{f}$ represents the estimate of the object attenuation coefficient $f$, then bias can be defined as $b(f)=E\{\hat{f}\}-f$. The relationship between CRIB and FIM and bias can be written as below:

$$COV(\hat{f}) \geq (1+\nabla_f b)[\mathcal{I}(f)]^{-1}(1+\nabla_f b)^T \quad (5)$$

Based on Eq (5), and using the variance and bias decomposition of MSE, the lower bound on MSE can be found as:

$$E\{(\hat{f}-f)(\hat{f}-f)^T\}=(1+\nabla_f b)[\mathcal{I}(f)]^{-1}(1+\nabla_f b)^T+bb^T \quad (6)$$

We can redefine MSE as trace $(E\{(\hat{f}-f)(\hat{f}-f)^T\})$, so Eq (6) can be rewritten as:

$$MSE=\text{trace}(E\{(\hat{f}-f)(\hat{f}-f)^T\}) \geq \text{trace}((I+\nabla_f b)\mathcal{I}[(f)]^{-1}(I+\nabla_f b))+\|b\|_2^2 \quad (7)$$

The problem associated with b and $\nabla_f b$ is that in general they do not have a closed analytical form. However, computing bias and its gradient may not be necessary because prior information on the object and Bayesian CRIB on the MSE (a.k.a. Van-Trees inequality) can be utilized, thus removing the dependence on bias.

The Fisher information described earlier is the general Fisher information. One may use general Fisher information when there is no prior information available on the parameter of interest, $f$. Assuming that the parameter of interest, the object attenuation coefficient $f$, is known to follow a specific distribution, $f \sim Pr(f;\theta)$, with a hyper parameter $\theta$. To incorporate the prior knowledge on $f$ into Fisher information. Bayesian Fisher information F can be used, which is defined as:

$$F = E_f\{\mathcal{I}(f)\} + \mathcal{I}_{prior} \quad (8)$$

If we define $Pr\{f=f_i\}=1/M$ for $i=1, \ldots, M$, then $$E\{I(f)\} = \frac{1}{M}\sum_{i=1}^{M} \mathcal{I}(f_i).$$

The Fisher information matrix associated with the prior distribution is defined as $\mathcal{I}=E_f\{-\nabla_f \log(P(f))\}$. Because the prior distribution has a discrete distribution then the Fisher information matrix is not defined for it. To solve this problem, we assume that prior distribution is modeled by a Gaussian mixture $$Pr\{f\} = \sum_{i=1}^{M} 1/M \mathcal{N}(f; f_i, \Sigma),$$

where $\Sigma = \sigma^2 I$ and I is the identity matrix. $\sigma^2$ is an arbitrary small positive number. The prior Fisher information matrix ($\mathcal{I}_{prior}$) associated with Gaussian Mixtures does not have a closed form, but it can be shown that $$\mathcal{I}_{prior} \leq \frac{1}{\sigma^2} I.$$

Using $$\frac{1}{\sigma^2} I$$

instead of $\mathcal{I}_{prior}$ for determining F in Eq (8), it can be rewritten as:

$$F = E_f\{\mathcal{I}(f)\} + \frac{1}{\sigma^2} I \quad (9)$$

Now that the Bayesian Fisher Information is defined, the Bayesian CRLB on MSE can be described as:

$$MSE \geq \text{Bayesian } CRLB = \text{trace}(F^{-1}) \quad (10)$$

In some configurations, the object of interest is positioned on a moving belt or platform that is in motion. In order to evaluate the disclosed multiplexed measurement systems and compare their performance to a conventional system, the relationship between the belt speed (or more generally, scan time) and total number of photons must be determined. Continuing with the example presented in connection with FIGS. 1, 2(a) and 2(b), let us assume that each source has a flux of $J^o$ photons per second available; further assume that each exposure takes 1 second. Based on these assumptions, the conventional system takes 25 seconds to perform the measurement, and the total number of photons that it uses is 25 $J^0$ in 25 seconds. In such a conventional system, the measurements are performed by turning each one of the 25 sources sequentially. Similarly, for the disclosed multiplexed systems with one exposure (MUX1)—i.e., two or more of the sources are simultaneously turned on, the system performs the measurements in one second and uses up to 25 $J^0$ of the available photons in one second. Thus one can state that MUX1 is potentially 25 times faster than the conventional system. To have a fair comparison, we assume that the belt speed is fixed for both system, which means both systems have the same amount of time to perform the measurement. For simplicity and to avoid confusion, it is desired to omit any variables that represent belt speed: Thus, to represent both systems as experiencing the same belt-speed, the photon-flux of the conventional system can be modified such that both systems take the same time to perform the measurement. For example, the photon-flux for each source in the conventional system can be changed to be $J^0/25$ per second; in this way, the conventional and the MUX1 systems both take 1 second to perform each measurement. This means that the total number of photons for conventional system is. $J^0$ in 25 seconds. In a similar fashion, the photon-flux of a conventional system can be changed to have the same belt speed as MUX2, MUX3, MUX4 and MUX5 systems. In the optimization problem described above, the total number of photons available for the multiplexed system, $J_0$, can be defined as the product: (the number of exposures)×(the number of photons per exposure). It is important to note that each exposure takes a fixed amount of time; thus, for example, if MUX1 takes 1 second to perform the measurement then MUX2 takes 2 seconds to do the measurement, and so on.

Based on the optimization problem presented by Eq (1), improved configuration of the multiplexed measurement system can be obtained. In some of the examples that follow, the MSE and other performance parameters are computed and are used to compare the performance of the conventional and multiplexed measurement systems.

Figure 3:
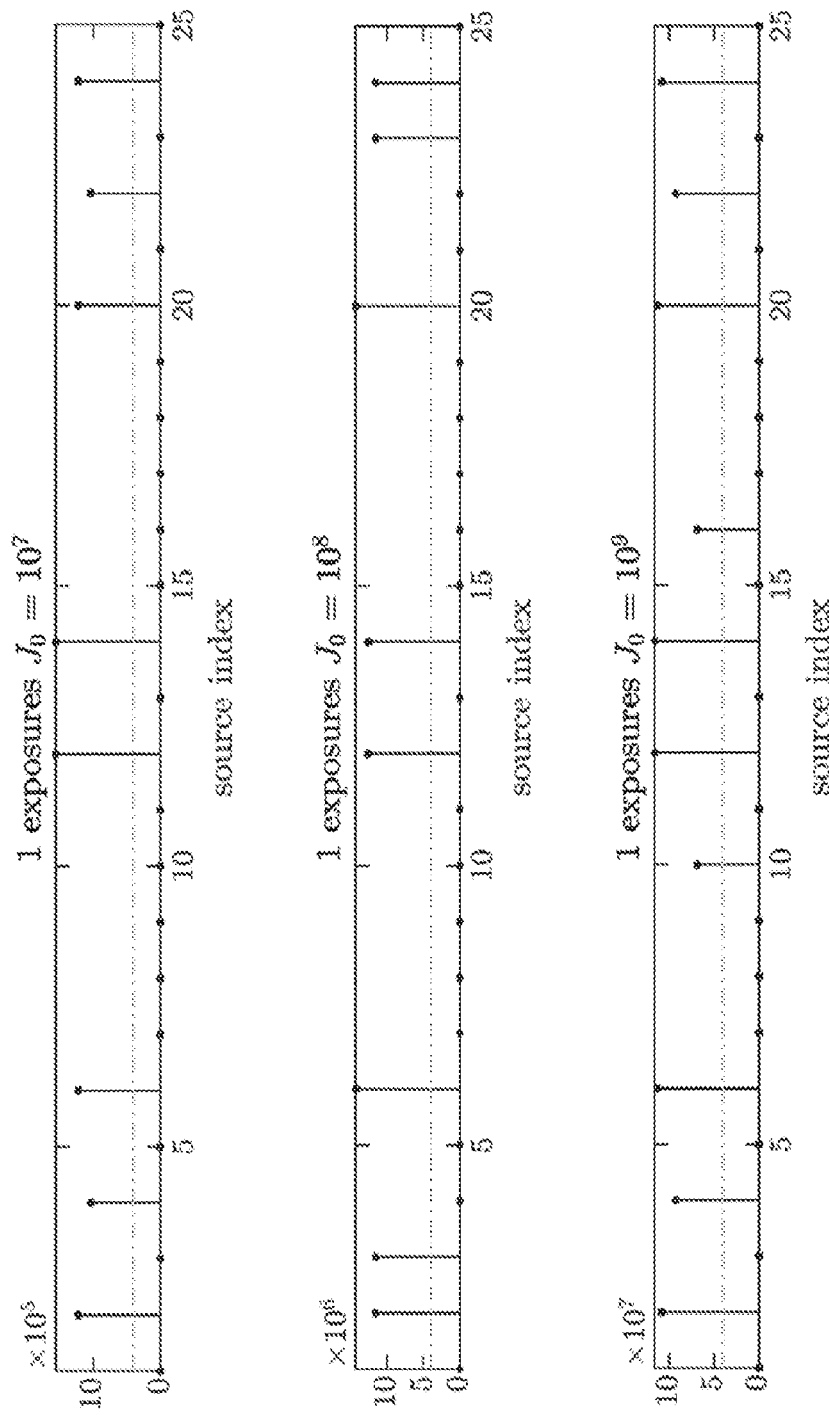
FIG. 3 shows source configuration for a multiplexed system that operates using a single exposure in accordance with an example embodiment.
Figure 4A:
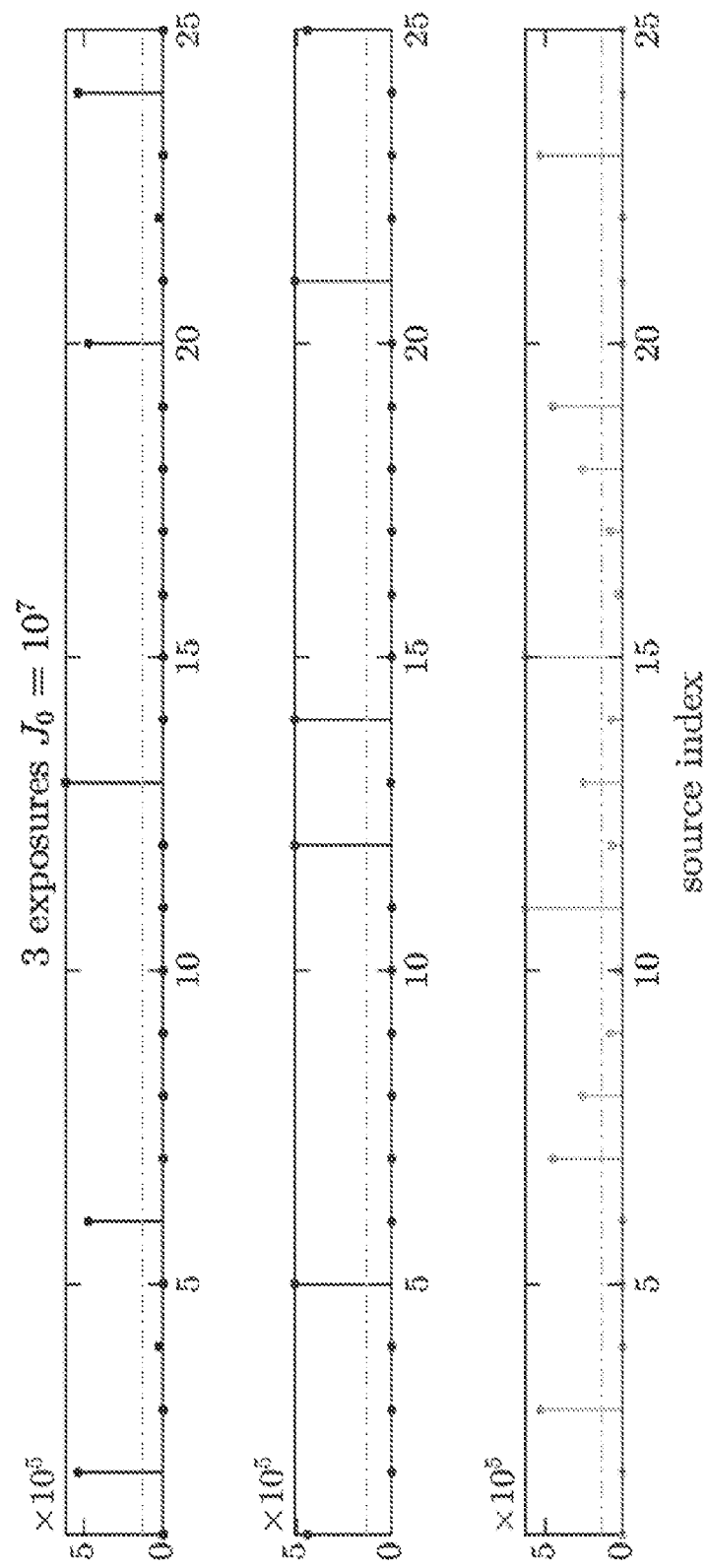
FIG. 4(a) illustrate source configuration for a multiplexed system that operates using three exposures and a first photon budget in accordance with an example embodiment.
Figure 4B:
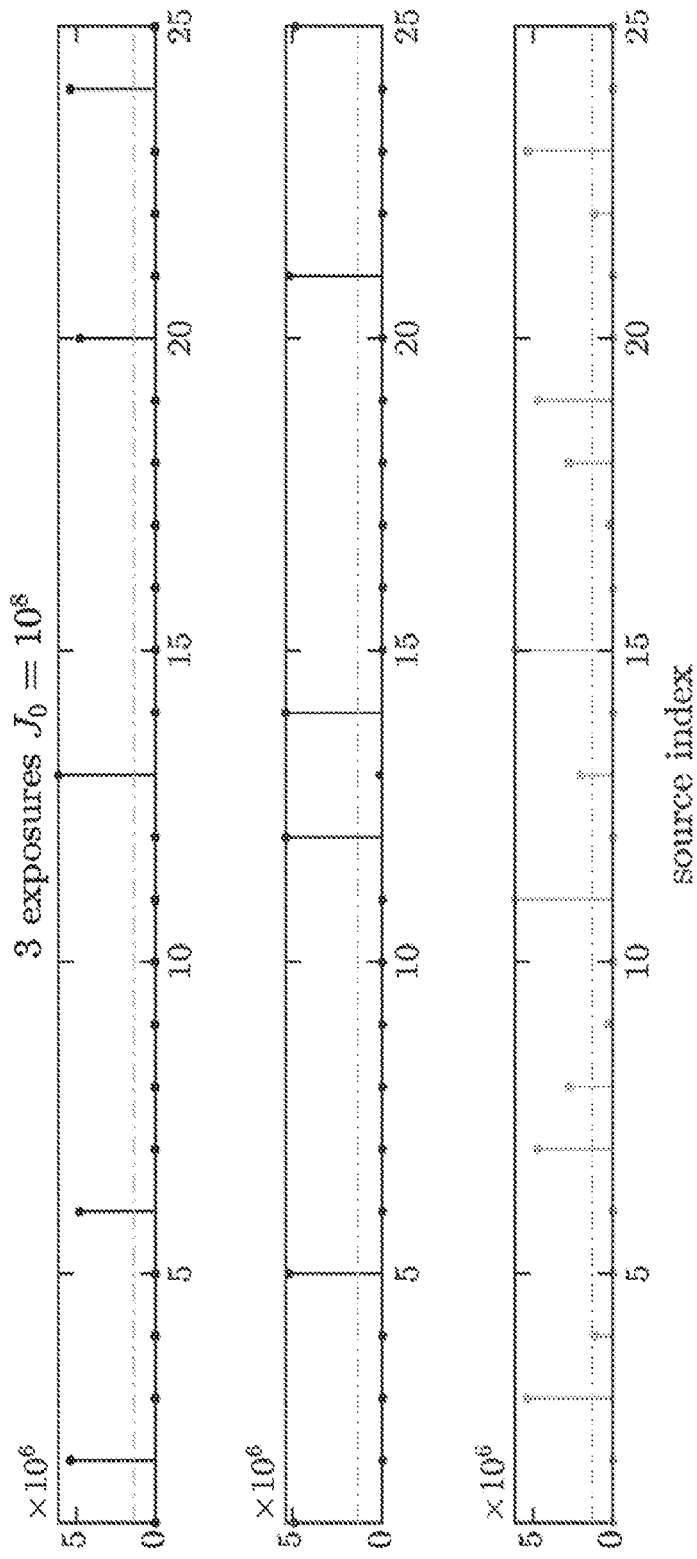
FIG. 4(b) illustrate source configuration for a multiplexed system that operates using three exposures and a second photon budget in accordance with an example embodiment.
Figure 4C:
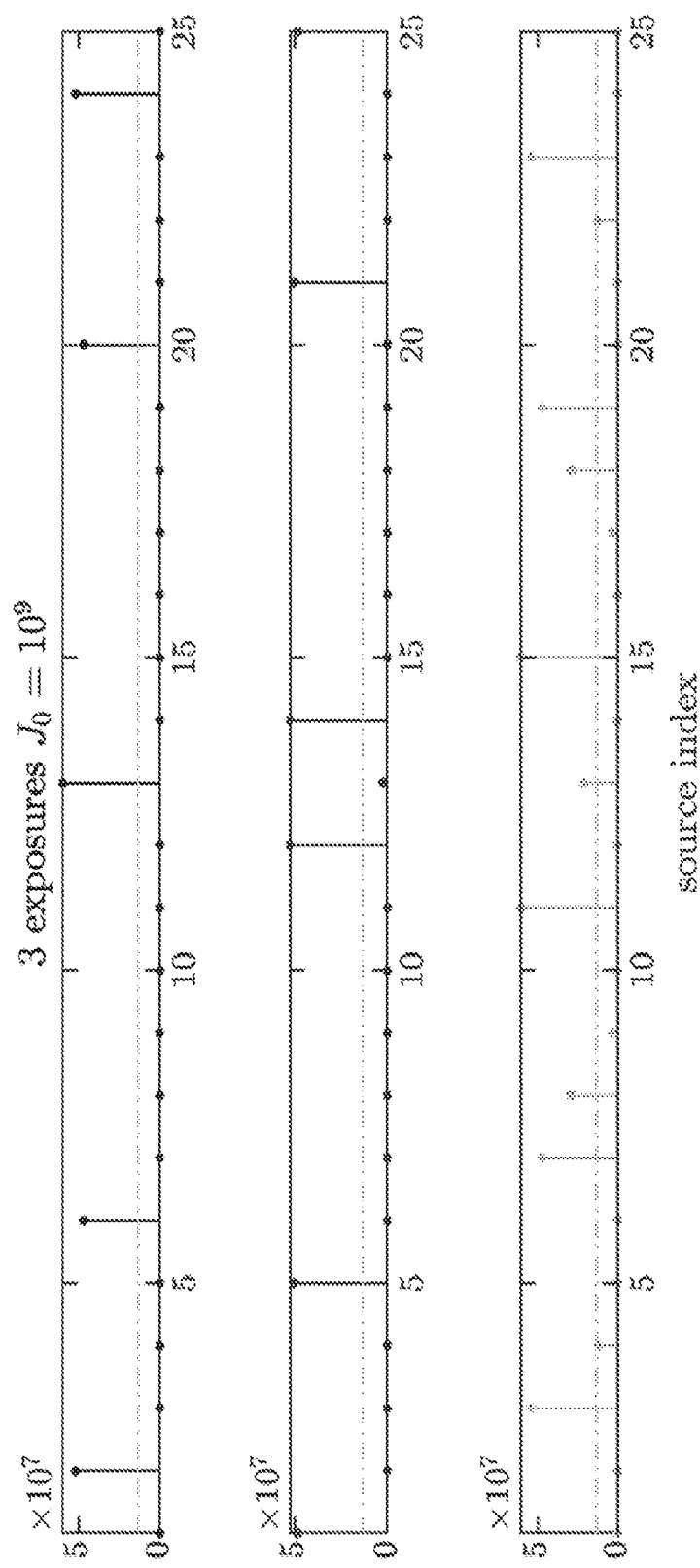
FIG. 4(c) illustrate source configuration for a multiplexed system that operates using three exposures and a third photon budget in accordance with an example embodiment.

Optimization solutions for the multiplexed system with 1, 3 and 5 exposures for different total number of photons ($J_0$ or SNR) are shown by FIGS. 3 to 5. In particular. FIG. 3 shows a source configuration for a multiplexed system that operates using a single exposure (i.e., corresponding to a MUX1 system). Each row in FIG. 3 illustrates one exposure level (i.e., $J_0=10^7$, $10^8$ and $10^9$). The dashed line represents the photon distribution for a conventional system. The position of each source (indexed from 1 to 25) is shown on the horizontal axis. In each row, only a subset of sources is turned on each. The output energy level of the sources in each row is generally different, but can be the same (see, for example, sources 12 and 14 in the top row). Each source can be turned on to a predetermined maximum level. FIGS. 4(a), 4(b) and 4(c) illustrate source configurations for a multiplexed system that operates using three exposures (i.e., corresponding to a MUX3 system). The top row in FIG. 4(a) illustrates the source configuration (which sources are turned on and at what level) for the first exposure, the middle row in FIG. 4(a) illustrates the source configuration for the second exposure, and the bottom row illustrates the source configuration for the third exposure, with an exposure budget, $J_0$, of $10^7$. FIGS. 4(b) and 4(c) show similar configurations as in FIG. 4(a) but with exposure budget of $10^8$ and $10^9$, respectively. It is important to recall from FIG. 2(b) that sources 1-7 are located on the left side of the gantry, 8-18 on the center of the gantry and 19-25 on the right side of the gantry.

Figure 5A:
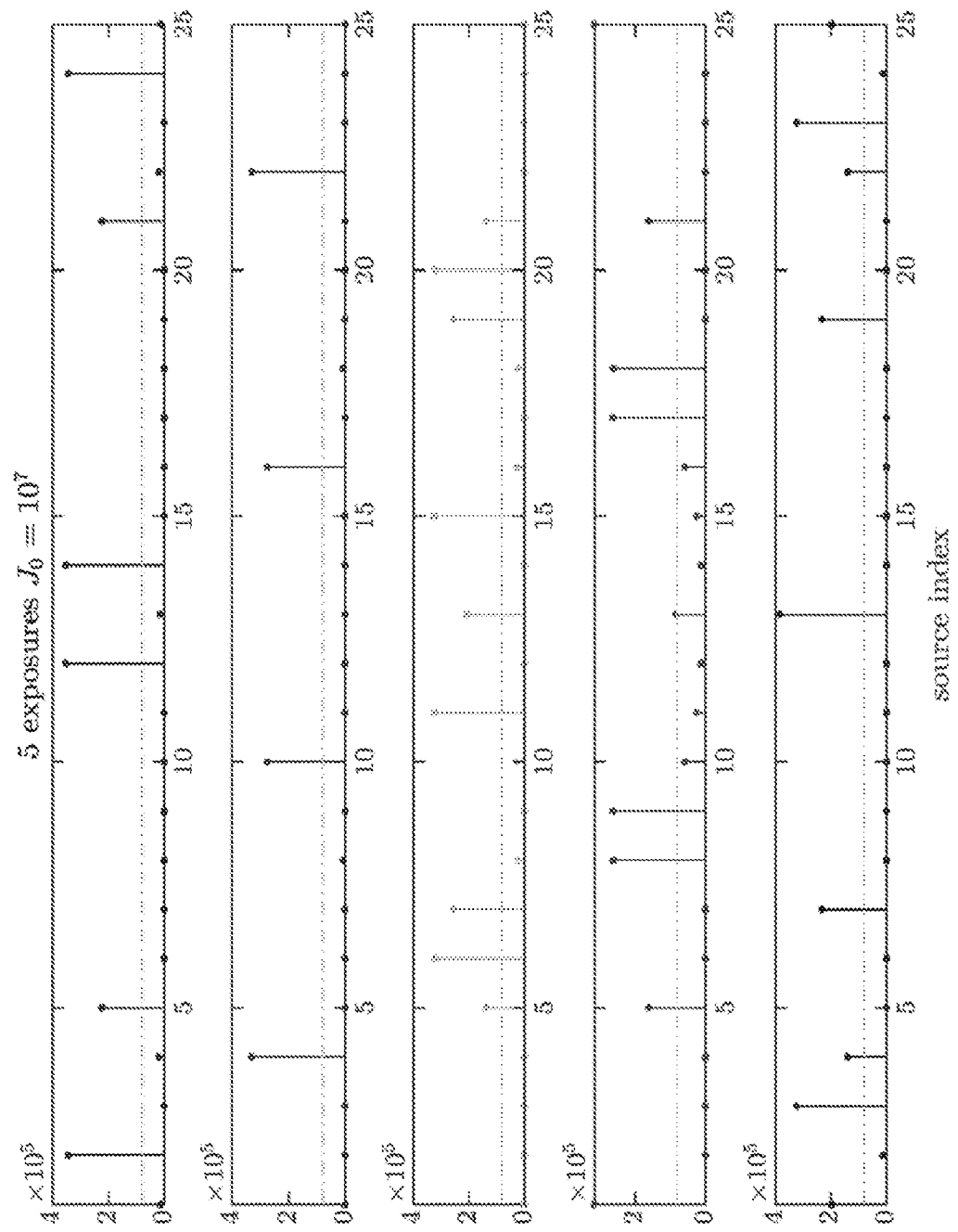
FIG. 5(a) illustrate source configuration for a multiplexed system that operates using five exposures and a first photon budget in accordance with an example embodiment.
Figure 5B:
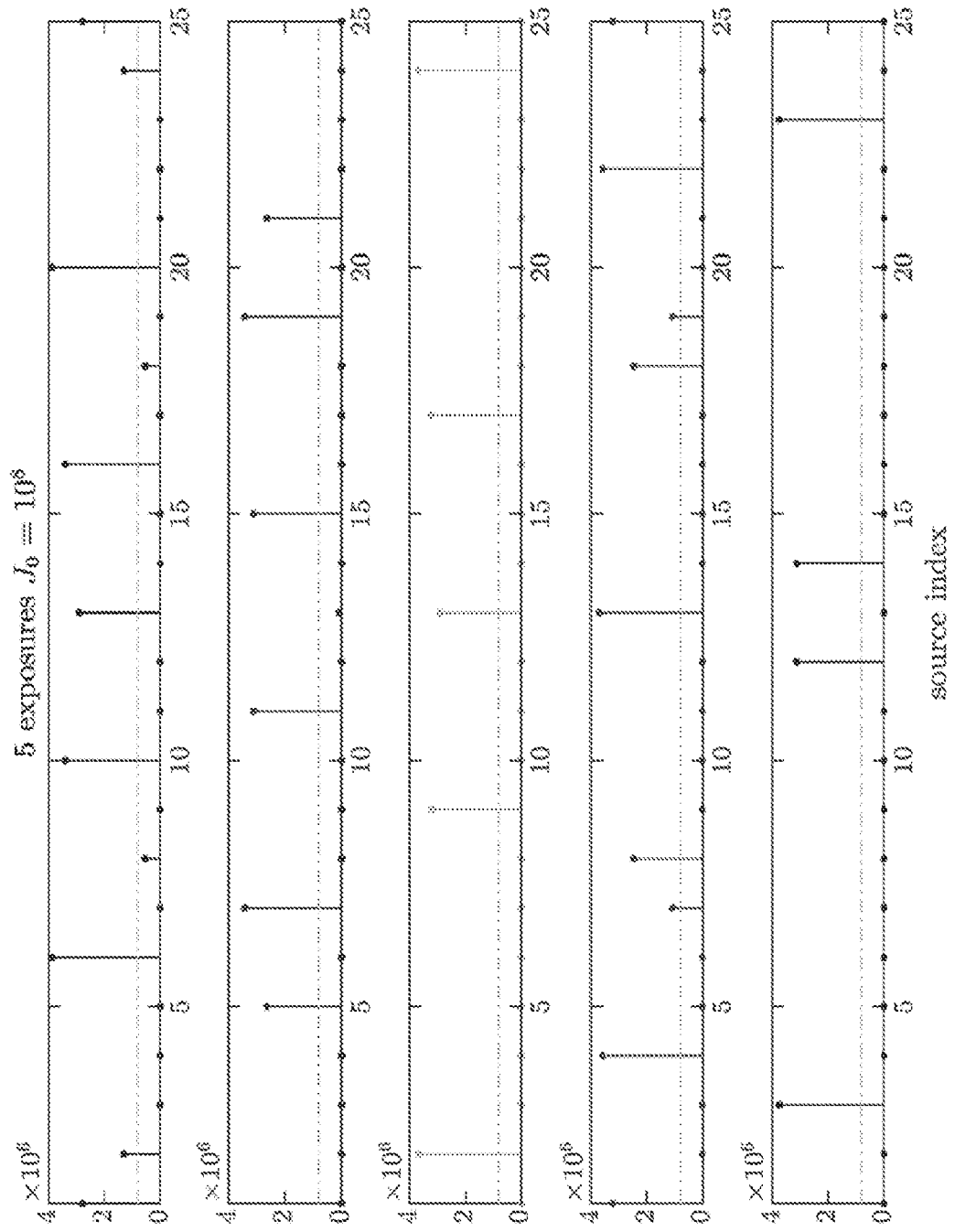
FIG. 5(b) illustrate source configuration for a multiplexed system that operates using five exposures and a second photon budget in accordance with an example embodiment.
Figure 5C:
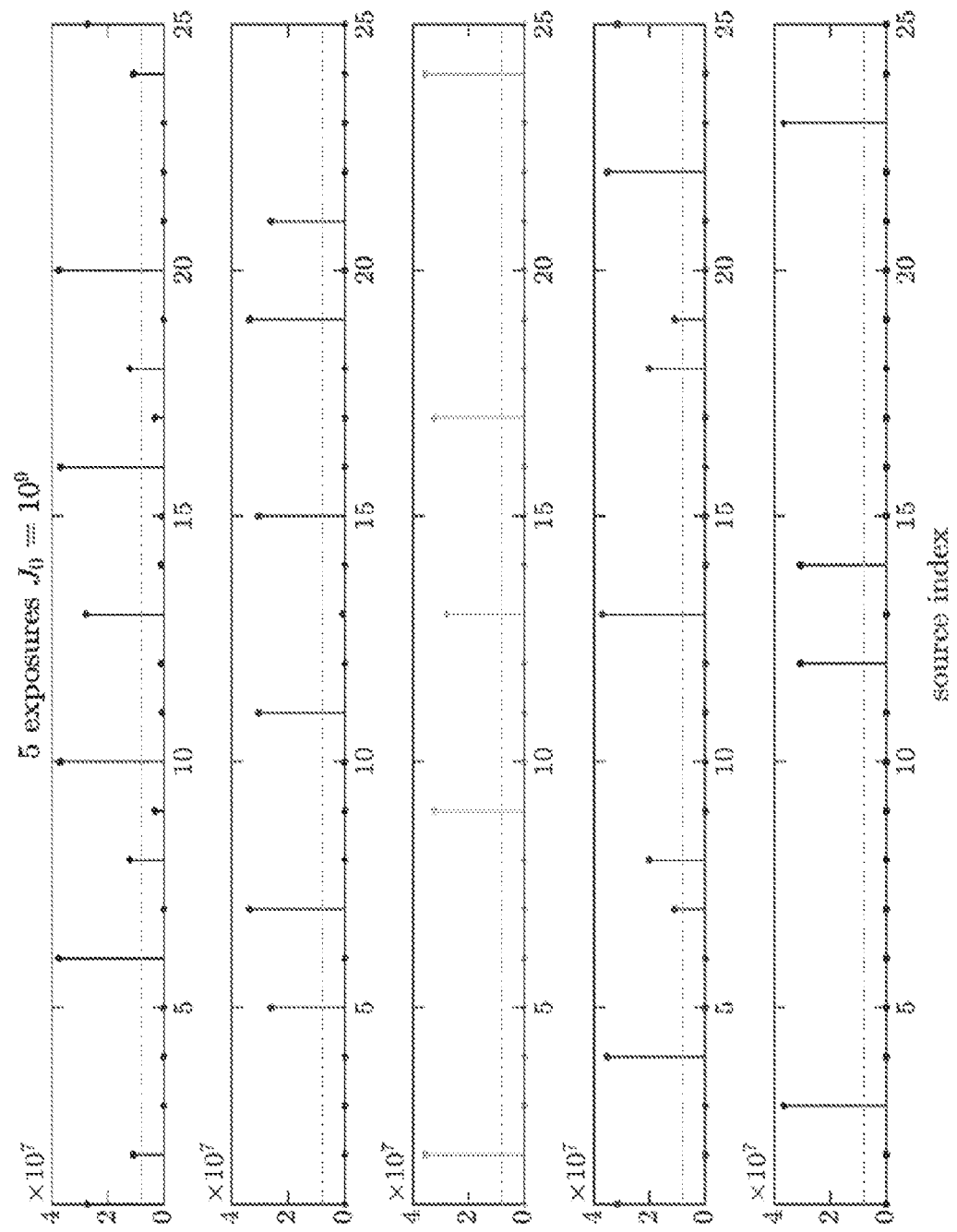
FIG. 5(c) illustrate source configuration for a multiplexed system that operates using five exposures and a third photon budget in accordance with an example embodiment.
Figure 6:
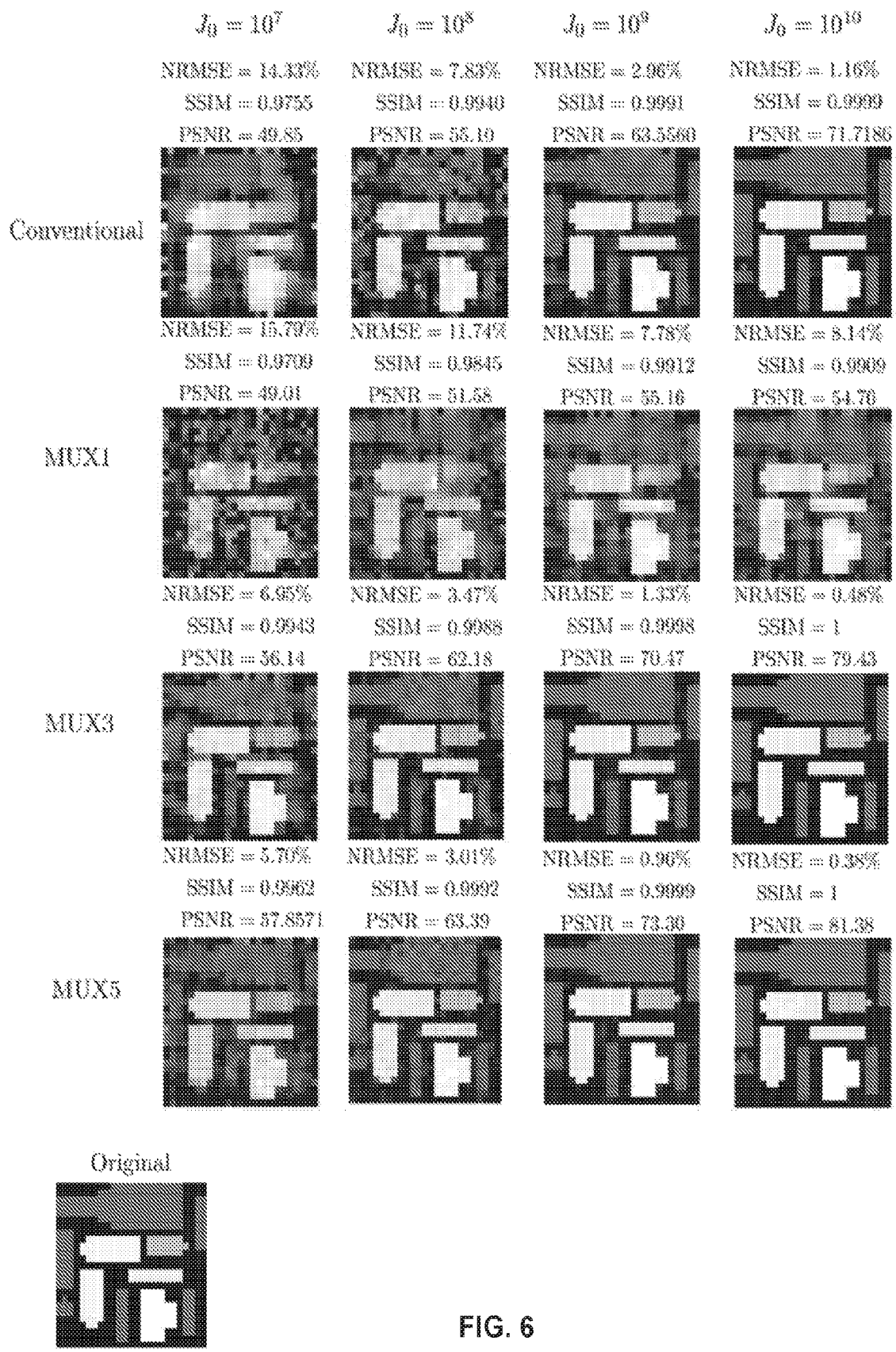
FIG. 6, illustrates image reconstruction results obtained in accordance with an example embodiment from three different multiplexed systems and a conventional system associated with a training set object.
Figure 7:
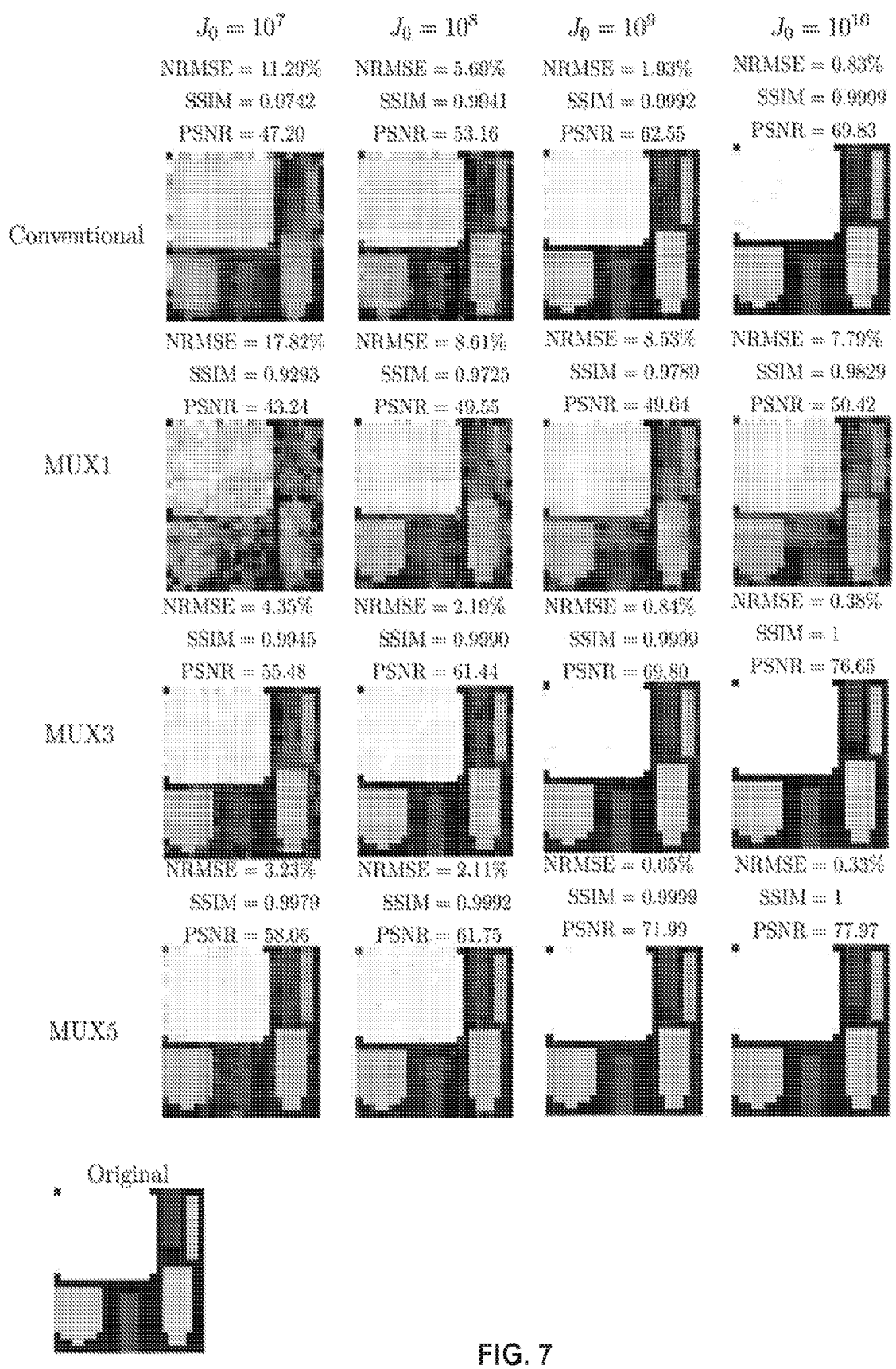
FIG. 7 illustrates image reconstruction results obtained in accordance with an example embodiment from three different multiplexed systems and a conventional system associated with another training set object.
Figure 8:
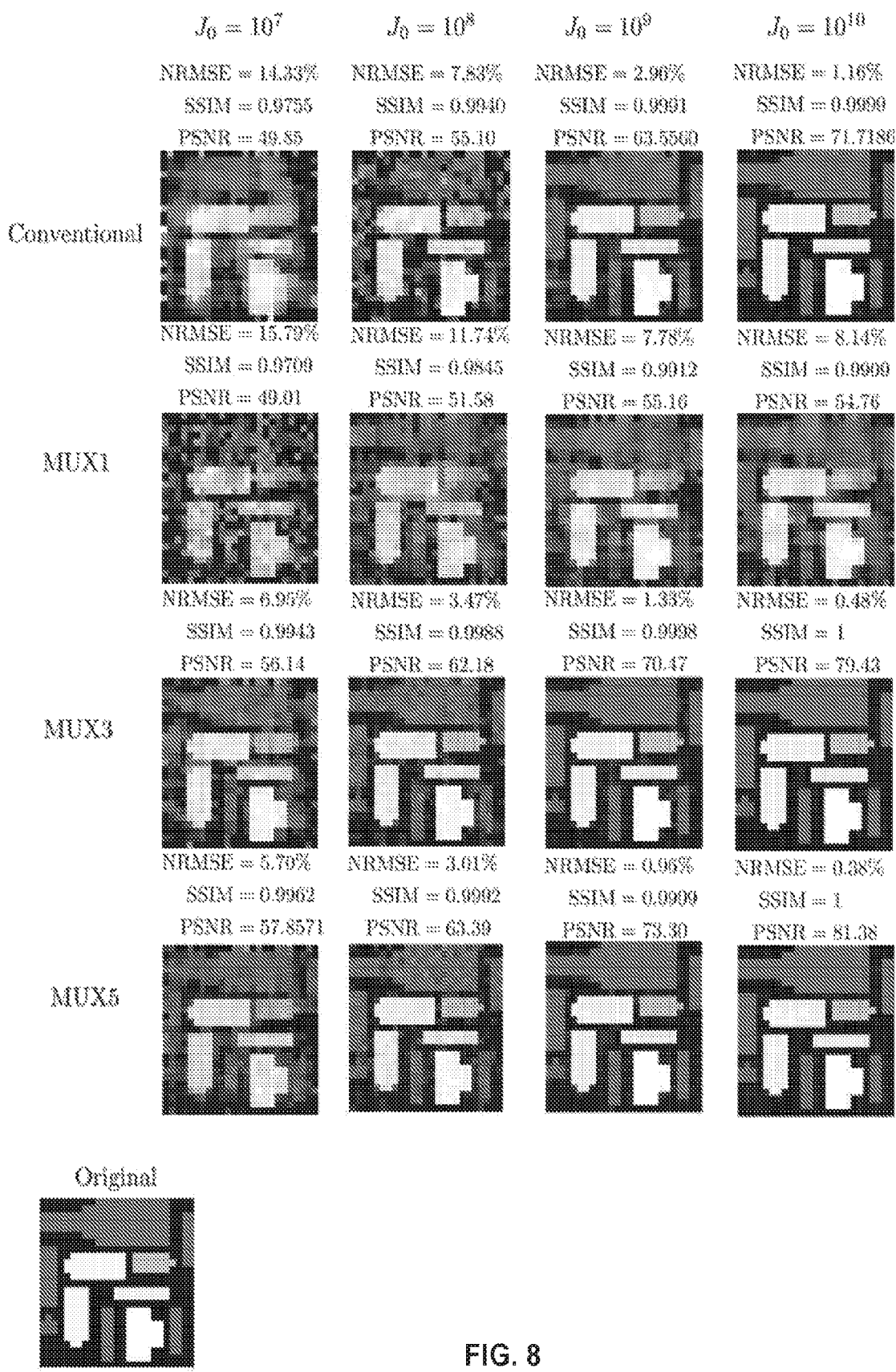
FIG. 8 illustrates image reconstruction results obtained in accordance with an example embodiment from three different multiplexed systems and a conventional system associated with a test-set object.
Figure 9:
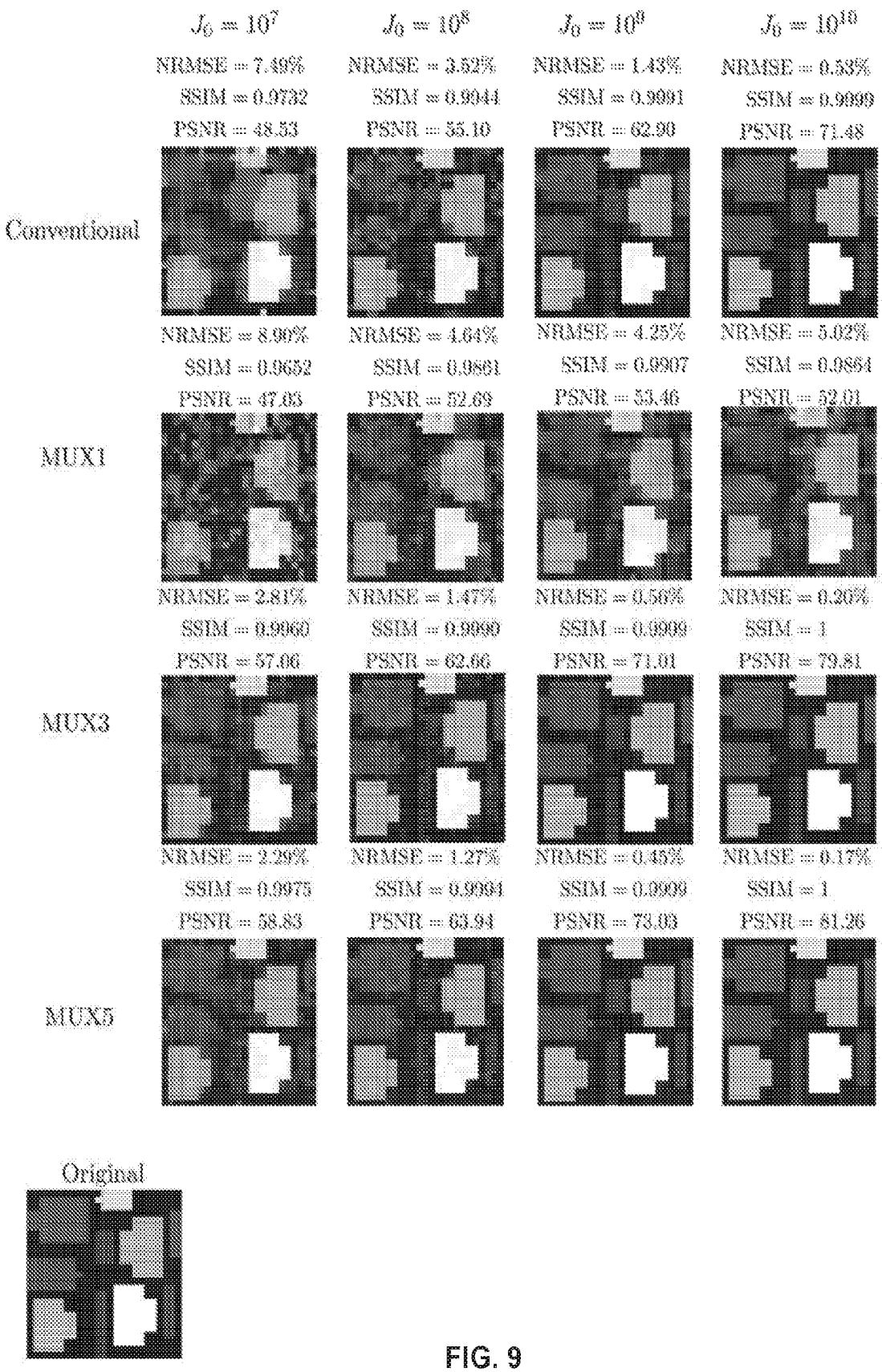
FIG. 9 illustrates image reconstruction results obtained in accordance with an example embodiment from three different multiplexed systems and a conventional system associated with another test set object.

In FIGS. 4(a) to 4(c), the source pattern does not change significantly as the SNR increases (i.e., as the signal $J_0$ increases), because the Bayesian FIM, F, is dominated by the term, $E_f\{\mathcal{I}(f)\}$, which is a linear function of $J_0$ (see Eq (9)) FIGS. 5(a) to 5(c) illustrate source configurations for a multiplexed system that operates using five exposures (MUX5), having total photon budgets of $10^7$, $10^8$ and $10^9$, respectively.

The multiplexed measurement design in each multiplexed exposure has a tendency to result in a sparse source pattern, while avoiding two adjacent sources on same side of the gantry to maximize angular/spatial diversity. This can be due to the adjacent sources having similar views of the object. By comparing the source pattern from different exposures, it is evident that the multiplexed system has a tendency not to select the same sources in two or more different exposures, thus allowing the multiplexed system to benefit from further angular/spatial diversity. On the other hand, to reconstruct the image of the object, the system needs to cover all the pixels (or segments) of the object; this may force the system to turn on two adjacent sources in some cases. Further, due to the sub-optimality of the multiplexed design, the source pattern in some instances can include two adjacent sources in one exposure or repeated sources in different exposures.

For reconstruction of the image, penalized-likelihood (penalized I-divergence) was used to reconstruct both the 25×25 pixel and 50×50 pixel images. An example image reconstruction technique in presented in appendix A1. Starting with the 25×25 pixel images, FIGS. 6 to 9 compare the reconstruction results from the multiplexed measurement system with different number of exposures with the conventional system for different training and test sets. Recall that belt speed is same for both systems in each figure. In these figures, NRMSE stands for normalized mean square error, SSIM represents structural similarity index and PSNR represents peak SNR. As evident from FIG. 6 to 9, as the measurement SNR ($J_0$) increases, the reconstruction quality improves for all systems. The conventional system outperforms the multiplexed system with one multiplexed exposure for all SNR instances. The multiplexed systems with 3 and 5 exposures outperform the conventional system in all SNR regions Thus the quality of reconstructed image depends on the number of measurements and the SNR. The conventional system obtains more measurements with lower SNR compared to the multiplexed measurement system. Because the image has a relatively low resolution, fewer number of measurements are needed to reconstruct the image, so SNR plays a major role in terms of image reconstruction quality. This is why MUX3 and MUX5 systems outperform the conventional system.

FIG. 10 provides four tables that compare different performance characteristics associated with FIGS. 6 to 9. Analysis of these table reveals that by increasing the measurement SNR, the MSE of the conventional and multiplexed measurement systems decreases. The MSE values of the multiplexed system decreases as the number of exposures increases. MUX3 and MUX5 systems outperform the conventional system in all SNR regions. It should be noted that for numerical evaluation of MSE, 52 training bags are used, and for each bag 20 noisy measurement realizations are used. For the test set, which is distinct from the training set, 10 bags are used and for each bag 20 noisy measurement realizations are used.

Figure 11A:
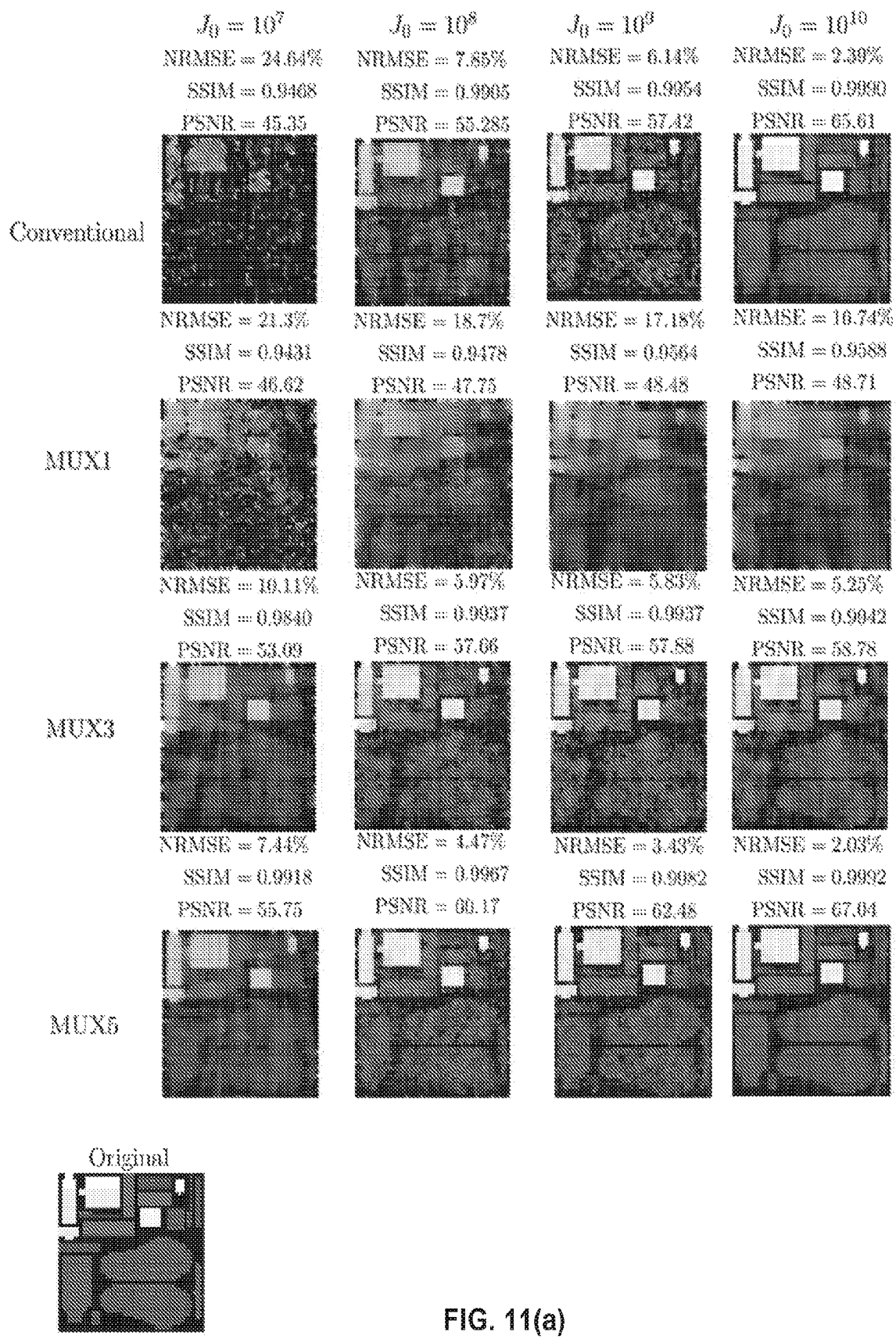
FIG. 11(a) illustrates image reconstruction results obtained in accordance with an example embodiment from three different multiplexed systems and a conventional system associated with a high-resolution test-set object.
Figure 12A:
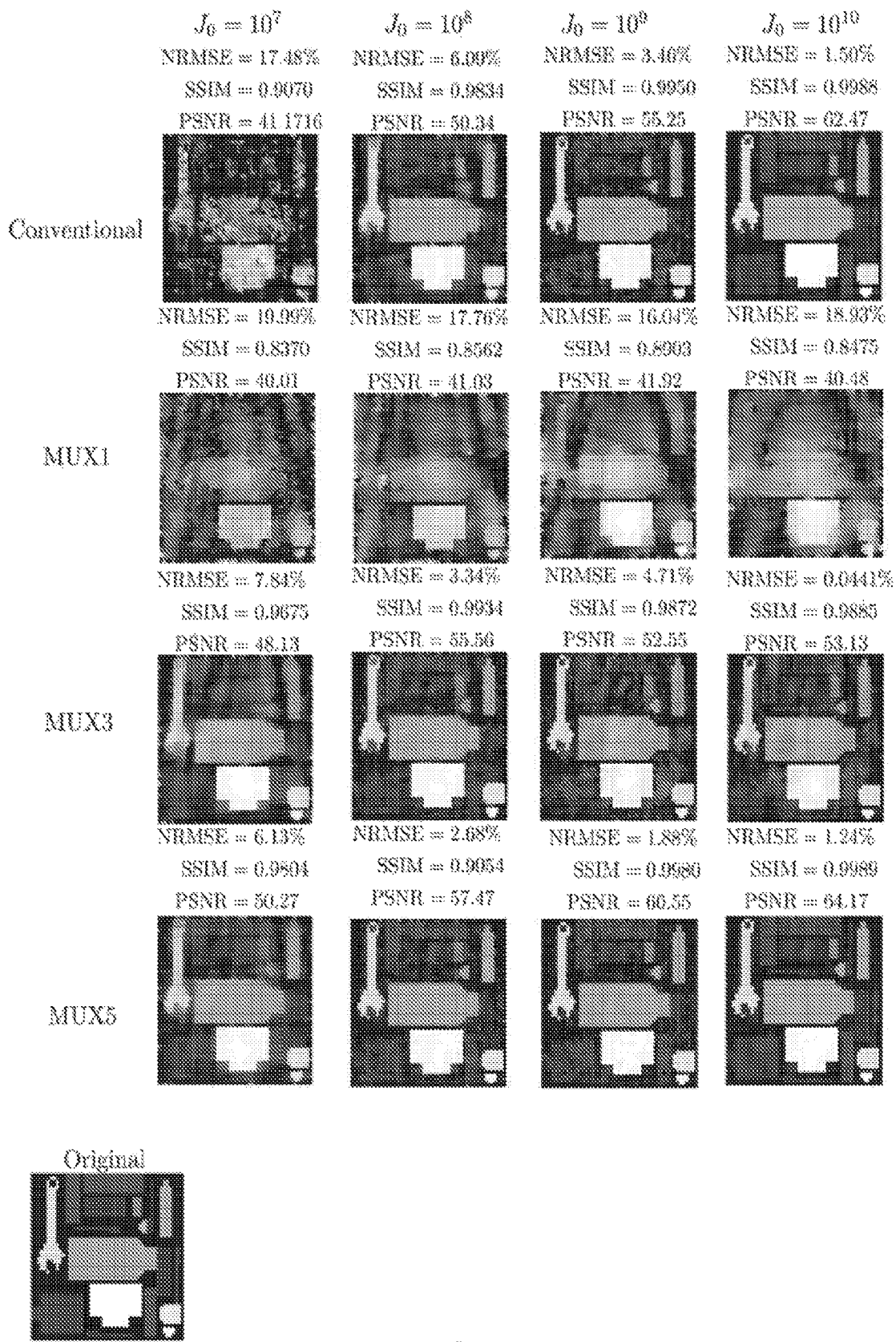
FIG. 12(a) illustrates image reconstruction results obtained in accordance with an example embodiment from three different multiplexed systems and a conventional system associated with another high-resolution test-set object.

Similar analysis for 50 by 50 pixel bags were conducted. Because the resolution of the images is increased (i.e., 50×50 instead of 25×25) while keeping the number of measurements fixed, the conventional system is expected to perform better in the high SNR region due to its inherent higher spatial/angular diversity. FIGS. 11(a) and 12(b) illustrate reconstruction results obtained using the multiplexed measurement system with different number of exposures and with the conventional system for different test sets. FIGS. 11(b) and 12(b) provide tables that summarize NRMSE values associated with FIGS. 11(a) and 12(a), respectively. Analysis of FIGS. 11(a) to 12(b) reveals that the conventional system outperforms MUX1 in all SNR regions. MUX3 system has a better image reconstruction quality than the conventional system in low SNR regions, but in high SNR regions the conventional system outperforms the MUX3 system. MUX5 system generally outperforms the conventional system; however, in high SNR regions, their performances are fairly comparable. Nonetheless, in both MUX3 and MUX 5 systems, the results are obtained faster (three times and five times, respectively) compared to the conventional system.

Similar to the 25 by 25 pixel images, the numerical evaluations of MSE were carried out using 52 training bags, and for each bag 20 noisy measurement realizations were used. For testing purposes, 10 test bags (distinct from training bags) were used, and for each bag 20 noisy measurement realizations were used.

The disclosed next generation gantry CT-based system architecture includes several X-ray sources and detector arrays that can be deployed in a fixed geometry. As such, the system architecture enables the exploration of non-standard multiplex measurement designs employing simultaneous illumination from multiple sources. One design objective of the multiplexed measurement system is to minimize the bag reconstruction error (e.g., Mean Square Error (MSE)) for a given source flux budget and/or fixed measurement time. For example, a Bayesian Cramer-Rao Lower Bound (CRLB) on reconstruction error can be used as a multiplex measurement design metric, subject to a fixed source flux/ measurement time constraint. The disclosed optimized multiplexed measurement designs can significantly outperform the sequential measurement design employed in a traditional RFG CT system. This reconstruction fidelity improvement with multiplexed measurement design can be characterized using simulations to assess its potential benefits in terms of operational system performance metrics such as bag reconstruction fidelity and system throughput.

While the above examples were described using the example of a multiplexed measurement system based on a rectangular fixed gantry x-ray imaging system, it is understood that the disclosed techniques can be applied to other system, such as those that use a geometry other than a square rectangular array. For example, in some configurations, four linear segments of detectors forming a rectangle/square or N linear segments of detectors forming a N-sided polygon, and the like can be constructed and an operated based on the disclosed embodiments. The disclosed embodiments can be implemented in both fixed and rotating gantries. The multiplexed measurement system can be designed by a gradient search on Bayesian Cramer-Rao lower bound on mean square error. The advantages of using Bayesian Cramer-Rao bound include: 1) it has a closed analytical form and 2) it is a smooth function of x-ray source flux.

Figure 13:
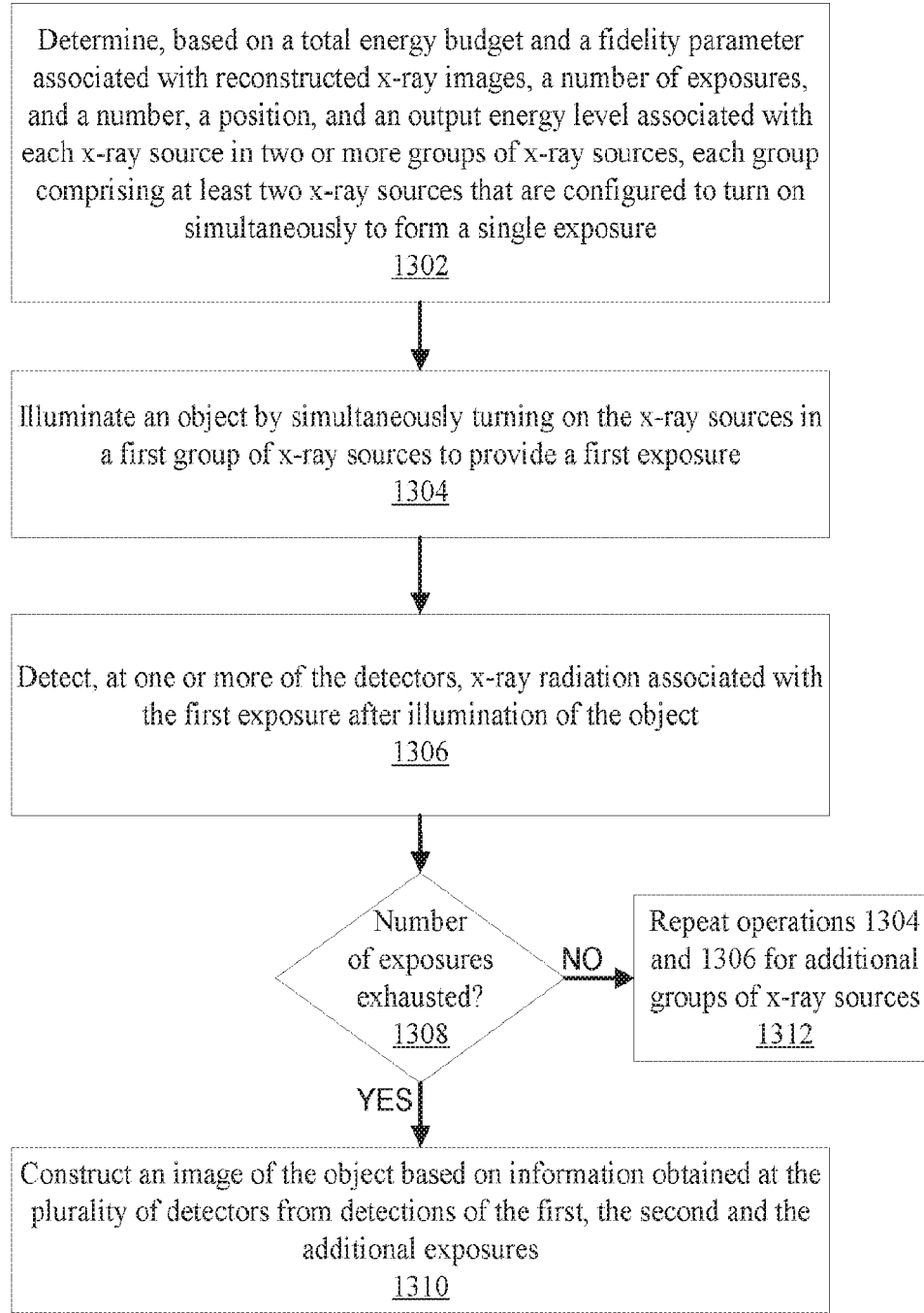
FIG. 13 illustrates a set of operations that can be carried out to construct an image using an x-ray detection system in accordance with an example embodiment.

FIG. 13 illustrates a set of operations that can be carried out to construct an image using an x-ray detection system in accordance with an example embodiment. The x-ray detection system includes a plurality of x-ray sources and a plurality of detectors. At 1302, based on a total energy budget and a fidelity parameter associated with reconstructed x-ray images, a number of exposures, and a number, a position, and an output energy level associated with each x-ray source in two or more groups of x-ray sources are determined. Each group includes at least two x-ray sources that are configured to turn on simultaneously to form a single exposure. At 1304, an object is illuminated by simultaneously turning on the x-ray sources in a first group of x-ray sources to provide a first exposure. At 1306, x-ray radiation associated with the first exposure is detected at one or more of the detectors after illumination of the object. At 1308, a determination is made as to whether the number of exposures has been exhausted, and if not (i.e., NO at 1308), at 1312, operations of 1304 and 1306 are repeated for a second and any additional groups of x-ray sources to detect radiation associated with a second and any additional exposures. If the number of exposures is reached, then at 1310, an image of the object based on information obtained at the plurality of detectors is constructed from detections of the first and subsequent exposure(s). The number of exposures is more than one, and can be three, five or other numbers.

In one example embodiment, the number of exposures, and the number, the position, and the output energy level associated with each x-ray source are determined at least in-part based on a particular total energy budget for each exposure. In another example embodiment, the number of exposures, and the number, the position, and the output energy level associated with each x-ray source are determined at least in-part based on a fidelity error for reconstruction of images, or detection/classification of object(s) or material(s) obtained by the x-ray detection system. In one example embodiment, the fidelity error is determined based on Bayesian Cramer-Rao Lower Bound associated with a mean square error (MSE).

According to another example embodiment, one or more of the number, the position, and the output energy level of the x-ray sources in each group is different from one or more of the number, the position, and the output energy level of the x-ray sources in other groups. In yet another example embodiment, the x-ray detection system is a fixed gantry x-ray computed tomography system. In still another example embodiment, the plurality of detectors forms a U-shaped structure that partially surrounds an area designated for placement of the object. In one example embodiment, the plurality of x-ray sources are positioned at equally distant positions with respect to one another, and each x-ray source is configured to emit a fan-shaped beam toward the object.

On aspect of the disclosed embodiments relates to an x-ray computed tomography system that includes one or more x-ray sources that are configured to produce x-ray beams directed to a target, one or more detectors to receive at least a portion of the x-ray beams upon traversal through the target, and a processor and a memory including instructions stored thereon, wherein the instruction upon execution by the processor cause the processor to receive information associated with the detected x-rays that comprise a multiplexed set of measured values, and to process the received information to produce an image or to produce an indication of an identification value or metric.

In one example embodiment, the x-ray computed tomography system is a fixed gantry x-ray computed tomography system. In another example embodiment, the processing of the information is based at least in-part of a Bayesian Cramer-Rao Lower Bound for the minimizing the reconstruction/estimation error or Mean Square Error (MSE). In another example embodiment, the system is a multiplexed system, having multiple sources that are operable simultaneously at varying fluence levels. In yet another example embodiment, the target is a moving object. In still another example embodiment, the processing of the information includes a reconstruction operation. In one example embodiment, the reconstruction operations utilize penalized-likelihood or penalized I-divergence.

In some embodiments, an imaging fidelity metric, such as Bayesian Cramer-Rao Bound (BCRB), is used to optimize the multiplex measurement design subject to source flux constraint(s). The optimized multiplexed measurement techniques can significantly outperform conventional sequential non-multiplexed measurement designs employed in traditional FG X-ray CT imaging systems. Such multiplexed measurement embodiments offer potential benefits in terms of operational system performance metrics such as imaging fidelity and system throughput.

Another aspect of the disclosed embodiments relates to an x-ray detection system that includes a plurality of x-ray sources configured to illuminate an area designated for placement of an object from a plurality of different angles. The x-ray detection system also includes a plurality of detectors positioned in periphery of the area, each detector configured to receive x-ray radiation associated with one or more of the x-ray sources upon passage through the object. In the x-ray detection system, the x-ray sources are configured to selectively emit x-ray radiation toward the object in groups of two or more x-ray sources that are turned on simultaneously to provide a single exposure. Each of the plurality of the x-ray sources is configured to turn on at a particular energy level above zero and below a predetermined maximum output energy level. Additionally, the x-ray sources are configured to provide a plurality of exposures by selectively turning on a first group of two or more x-ray sources simultaneously to provide a first exposure and by selectively turning on one or more additional groups of two or more x-ray sources to provide additional exposures.

In one example embodiment, each exposure is limited by a particular total energy budget, and the x-ray sources within the first group or the one or more additional groups are selectively turned on to meet the particular total energy budget. In another example embodiment, a number, a position and an output energy level of the x-ray sources within the first group or the additional groups are determined at least in-part based on a computed fidelity error for reconstruction of images, or detection/classification of object(s) or material(s) obtained by the x-ray detection system. In yet another example embodiment, the number, the position and the output energy level of the x-ray sources are determined at least in-part based on Bayesian Cramer-Rao Lower Bound associated with a mean square error (MSE).

According to another example embodiment, a number of additional groups of two or more x-ray sources that provide additional exposures is determined at least in-part based on a computed fidelity error for reconstruction of images obtained by the x-ray detection system, or detection/classification of object(s) or material(s) obtained by the x-ray detection system and a particular total energy budget. In still another example embodiment, one or more of a number, a position, and an output energy level of the x-ray sources that are turned on differs among the first group and the one or more additional groups of two or more x-ray sources. In one example embodiment, the one or more additional groups consist of (a) two additional groups of x-ray sources, or (b) four additional x-ray sources.

In one example embodiment, the x-ray detection system is a fixed gantry x-ray computed tomography system. In another example embodiment, the plurality of detectors forms a U-shaped structure that partially surrounds the area designated for placement of the object. In yet another example embodiment, the plurality of x-ray sources are positioned at equally distant positions with respect to one another, and each x-ray source is configured to emit a fan-shaped beam toward the object. In still another example embodiment, the x-ray detection system is configured to operate with a moving platform or belt, and the plurality of the x-ray sources are configured to illuminate the object that is located on the moving platform of belt. In one example embodiment, the x-ray detection system further includes a processor and a memory including instructions stored thereon, wherein the instruction upon execution by the processor cause the processor to receive information associated with detected x-rays radiation comprising a multiplexed set of measured values, and to process the received information to produce an image.

Another aspect of the disclosed embodiments relates to a multiplexed x-ray computed tomography measurement system, comprising a rectangular fixed gantry x-ray imaging system that is designed by a gradient search on Bayesian Cramer-Rao lower bound on mean square error. Another aspect relates to a method for image reconstruction in an x-ray computed tomography system that includes receiving multiplexed measurement data associated with an object, and reconstructing an image of the object using at least in-part a gradient search on Bayesian Cramer-Rao lower bound on mean square error.

It is understood that the various disclosed embodiments may be implemented individually, or collectively, in devices comprised of various components, electronics hardware and/or software modules and components. These devices, for example, may comprise a processor, a memory unit, an interface that are communicatively connected to each other, and may range from desktop and/or laptop computers, to mobile devices and the like. The processor and/or controller can perform various disclosed operations based on execution of program code that is stored on a storage medium. The processor and/or controller can, for example, be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

APPENDIX A1: EXAMPLE RECONSTRUCTION TECHNIQUE

This Appendix provides a brief description of an image reconstruction technique for both the conventional and multiplexed systems. The reconstruction technique is based on penalized maximum likelihood Maximizing the likelihood is equal to minimizing the I-divergence. Recall that E is the number of exposures and D is the number of detectors in a u-shaped detector array. Thus if y represents the measurement, then y has the dimensions of E×D. Further assume x represents attenuation coefficients of object. It has been shown that $$\min_{x \geq 0} I(y\|x) = \min_{p \in \mathcal{L}(y)}, \min_{q \in \varsigma} I(p\|q),$$

where $\mathcal{L}(y)$ and $\zeta$ are defined as below:

$$\mathcal{L}(y) = \left\{ p(i,s) : \sum_{s=1}^{25} p(i,s) = y_i \right\} \quad (A1)$$

$$\zeta = \left\{ q(i,s) : J(i,s)e^{-h_i^s x} \right\} \quad (A2)$$

In the above equations, s is the source index. It has been shown that by using Lagrangian multiplier, the below relationship between q and p can be obtained:

$$p(i,s) = y_i \frac{q(i,s)}{\sum_{s=1}^{25} q(i,s)} \quad (A3)$$

Assuming that $\hat{p}$ is the estimate of p, then $I(\hat{p}\|q)$ is equal to:

$$I(\hat{p}\|q) = \sum_{i=1}^{D \times E}\sum_{s=1}^{25} \hat{p}(i,s)\sum_{j=1}^{N} h_i^s(j)x_j + \sum_{i=1}^{D \times E}\sum_{s=1}^{25} J(i,s)e^{-\sum_{j=1}^{N} h_i^s(j)x_j} \quad (A4)$$

If we assume that $\hat{x}$ is the current estimate of x, we can rewrite Eq (A4) as:

$$\sum_{i=1}^{D \times E}\sum_{s=1}^{25} \hat{p}(i,s)\sum_{j=1}^{N} h_i^s(j)x_j + \sum_{i=1}^{D \times E}\sum_{s=1}^{25} \hat{q}(i,s)e^{-\sum_{j=1}^{N} h_i^s(j)[\hat{x}_j - x_j]} \quad (A5)$$

Where $\hat{q}$ is the estimate of q based on $\hat{x}$. In Eq (A5) the terms which are not a function of x are ignored.

It is important to note that the 1-divergence is the data-fidelity term and there is a penalty term, as well, which is discussed later. Instead of minimizing I-divergence directly, a Jensen inequality can be used to find Jensen surrogate of Eq (A5), which can be used to minimize. Using the Jensen inequality, the following can be obtained:

$$\text{Eq } A5 \leq \quad (A6)$$

$$\sum_{i=1}^{D \times E}\sum_{s=1}^{25} \hat{p}(i,s)\sum_{j=1}^{N} h_i^s(j)x_j + \sum_{i=1}^{D \times E}\sum_{s=1}^{25} \hat{q}(i,s)e^{\frac{\sum_{j=1}^{N} h_i^s(j)[\hat{x}_j - x_j]}{r}}$$

Where $$r = \max_{i,s} \sum_{j=1}^{N} h_j^s(j).$$

Eq (A6) is a Jensen surrogate of the I-divergence. Similar operations can be carried out for the penalty term. The penalty term can be defined as:

$$R(x) = \sum_{j=1}^{N}\sum_{j'=1}^{N_j} w_{jj'} \psi(x_j - x_{j'}) \quad (A7)$$

Where $\psi(t)$ is a differentiable convex function of t. $N_j$ is the number of pixels neighboring $x_j$ and $w_{jj}'$ is a weight associated with $x_j$ and its neighbor pixel $x_{j'}$. If $\hat{x}$ is an estimate of x then an Jensen surrogate of $R(x)$ is:

$$R(x) \leq R(x, \hat{x}) = \sum_{i=1}^{N}\sum_{j'=1}^{N_j} \frac{w_{jj'}}{2}(\psi(2x_j - \hat{x}_j - \hat{x}_{j'}) + \psi(2x_{j'} - \hat{x}_j - \hat{x}_{j'})) \quad (A8)$$

The reconstruction is the result of below minimization:

$$x^* = \underset{x \geq 0}{\operatorname{argmin}} I(y\|q(x)) + \lambda R(x) \quad (A9)$$

The reconstruction algorithm based on Jensen surrogates for I-divergence and the penalty term is:

---

Input: $x^0$, y, H, J, $\lambda$ $$r = \max_{i,s} \sum_{j=1}^{N} h_i^s(j)$$

for n = 0, ..., N − 1

$\hat{q}(i, s) = J(i, s)e^{-h_i^s x^n}$ for s = 1, ..., 25 and i = 1, ..., D × E compute $\hat{p}(i, s)$ by Eq A3 for s = 1, ..., 25 and i = 1, ..., D × E $$x^{n+1} = \arg\min_{x \geq 0} \sum_{i=1}^{D \times E}\sum_{s=1}^{25} \hat{p}(i,s)\sum_{j=1}^{N} h_i^s(j)x_j + r\sum_{i=1}^{D \times E}\sum_{s=1}^{25} \hat{q}(i,s)e^{\frac{\sum_{j=1}^{N} h_i^s(j)(x_j^n - x_j)}{r}} + \lambda R(x, x^n)$$

end

---

The minimization in the reconstruction algorithm is convex and can be solved by the gradient-descent method or the Newton method. Huber type penalty can be used, which preserves the image edges.

$$\psi(t) = \alpha^2 \left( \left| \frac{t}{\alpha} \right| - \log\left(1 + \left| \frac{t}{\alpha} \right|\right) \right) \quad (A10)$$

What is claimed is:

1. An x-ray detection system, comprising:
a plurality of x-ray sources positioned on a periphery of an area designated for placement of an object and configured to illuminate the area designated for placement of the object from a plurality of different angles; and
a plurality of detectors, each detector configured to receive x-ray radiation associated with one or more of the x-ray sources upon passage through the object, wherein:
the x-ray sources are configured to selectively emit x-ray radiation toward the object in groups of two or more x-ray sources that are turned on simultaneously to provide a single exposure,
each of the plurality of the x-ray sources is configured to turn on at a particular energy level above zero and below a predetermined maximum output energy level, and
the x-ray sources are configured to provide a plurality of exposures by selectively turning on a first group of two or more x-ray sources simultaneously to provide a first exposure and by selectively turning on one or more additional groups of two or more x-ray sources to provide one or more additional exposures, wherein a position and an output energy level of each x-ray source and the number of x-ray sources within the first group and within the one or more additional groups are selected to meet a predetermined energy budget for each exposure, and wherein the number of x-ray sources in each group that are simultaneously turned on is less that total number of x-ray sources.

2. The x-ray detection system of claim 1, wherein the number, the position and the output energy level of the x-ray sources within the first group or the additional groups are determined at least in-part based on a computed fidelity error for reconstruction of images, or detection/classification of object(s) or material(s) obtained by the x-ray detection system.

3. The x-ray detection system of claim 2, wherein the number, the position and the output energy level of the x-ray sources are determined at least in-part based on Bayesian Cramer-Rao Lower Bound associated with a mean square error (MSE).

4. The x-ray detection system of claim 1, wherein a number of the additional groups of two or more x-ray sources that provide additional exposures is determined at least in-part based on a computed fidelity error for reconstruction of images, or detection/classification of object(s) or material(s) obtained by the x-ray detection system and a particular total energy budget.

5. The x-ray detection system of claim 1, wherein one or more of the number, the position, or the output energy level of the x-ray sources that are turned on differs among the first group and the one or more additional groups of two or more x-ray sources.

6. The x-ray detection system of claim 1, wherein the one or more additional groups consist of (a) two additional groups of x-ray sources, or (b) four additional x-ray sources.

7. The x-ray detection system of claim 1, wherein the x-ray detection system is a fixed gantry x-ray computed tomography system.

8. The x-ray detection system of claim 1, wherein the plurality of detectors forms a U-shaped structure that partially surrounds the area designated for placement of the object.

9. The x-ray detection system of claim 1, wherein the plurality of x-ray sources are positioned at equally distant positions with respect to one another, and each x-ray source is configured to emit a fan-shaped beam toward the area designated for placement of the object.

10. The x-ray detection system of claim 1, wherein the x-ray detection system is configured to operate with a moving platform or belt, and the plurality of the x-ray sources are configured to illuminate the object that is located on the moving platform of belt.

11. The x-ray detection system of claim 1, further including a processor and a memory including instructions stored thereon, wherein the instruction upon execution by the processor cause the processor to receive information associated with detected x-rays radiation comprising a multiplexed set of measured values, and to process the received information to produce an image.

12. The x-ray detection system of claim 1, wherein the two or more x-ray sources that are selectively turned on as part of the first exposure constitute a different set of x-ray sources that the two or more x-ray sources that are selectively turned on as part the one or more additional exposures.

13. The x-ray detection system of claim 1, wherein the two or more x-ray sources that are simultaneously turned on as part of the first exposure or as part of the one or more additional exposures exclude adjacent x-ray sources.

14. The x-ray detection system of claim 1, wherein at least some of the plurality of x-ray sources are turned off for a duration of each exposure.

15. A method for producing an x-ray image using an x-ray detection system that includes a plurality of x-ray sources positioned on a periphery of an area designated for placement of an object to illuminate the object from a plurality of different angles, the x-ray detection system further including a plurality of detectors, the method comprising:
determining, based on a total energy budget and a fidelity parameter associated with reconstructed x-ray images, a number of exposures, and a number, a position, and an output energy level associated with each x-ray source in two or more groups of x-ray sources, each group comprising at least two x-ray sources that are configured to turn on simultaneously to form a single exposure, wherein a number of x-ray sources in each group that are simultaneously turned on is less that total number of x-ray sources;
(a) illuminating an object by simultaneously turning on the x-ray sources in a first group of x-ray sources to provide a first exposure;
(b) detecting, at one or more of the detectors, x-ray radiation associated with the first exposure after illumination of the object;
(c) repeating operations (a) and (b) for a second and any additional groups of x-ray sources to detect radiation associated with a second and any additional exposures until the number of exposures are exhausted; and constructing an image of the object based on information obtained at the plurality of detectors from detections of the first, the second and the additional exposures.

16. The method of claim 15, wherein the number of exposures, and the number, the position, and the output energy level associated with each x-ray source are determined at least in-part based on a particular total energy budget for each exposure.

17. The method of claim 15, wherein the number of exposures, and the number, the position, and the output energy level associated with each x-ray source are determined at least in-part based on a fidelity error for reconstruction of images, or detection/classification of object(s) or material(s) obtained by the x-ray detection system.

18. The method of claim 17, wherein the fidelity error is determined based on Bayesian Cramer-Rao Lower Bound associated with a mean square error (MSE).

19. The method of claim 15, wherein one or more of the number, the position, or the output energy level of the x-ray sources in each group is different from one or more of the number, the position, and the output energy level of the x-ray sources in other groups.

20. The method of claim 15, wherein the x-ray detection system is a fixed gantry x-ray computed tomography system.

21. The method of claim 15, wherein the plurality of detectors forms a U-shaped structure that partially surrounds an area designated for placement of the object.

22. The method of claim 15, wherein the plurality of x-ray sources are positioned at equally distant positions with respect to one another, and each x-ray source is configured to emit a fan-shaped beam toward the object.

* * * * *